US012169623B2

(12) United States Patent
Lee

(10) Patent No.: US 12,169,623 B2
(45) Date of Patent: Dec. 17, 2024

(54) ELECTRONIC DEVICE AND OPERATION METHOD OF ELECTRONIC DEVICE

(71) Applicant: SAMSUNG ELECTRONICS CO., LTD., Suwon-si (KR)

(72) Inventor: Seonho Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/975,270

(22) Filed: Oct. 27, 2022

(65) Prior Publication Data

US 2023/0049621 A1 Feb. 16, 2023

Related U.S. Application Data

(63) Continuation of application No. PCT/KR2021/005088, filed on Apr. 22, 2021.

(30) Foreign Application Priority Data

Apr. 27, 2020 (KR) .................. 10-2020-0050596

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *G06F 40/143* (2020.01); *G06F 40/174* (2020.01)

(58) Field of Classification Search
CPC .... G06F 3/0484; G06F 3/0482; G06F 40/143; G06F 40/174; G06F 3/04842;
(Continued)

(56) References Cited

U.S. PATENT DOCUMENTS 6,854,085 B1* 2/2005 Morse .................. G06F 40/143
715/236
8,589,817 B2 11/2013 Fukimoto et al.
(Continued)

FOREIGN PATENT DOCUMENTS

KR 10-2004-0061710 A 7/2004
KR 10-2008-0001824 A 1/2008
(Continued)

OTHER PUBLICATIONS

International Search Report (PCT/ISA/210, PCT/ISA/220) issued Aug. 9, 2021 by the International Searching Authority for International Patent Application No. PCT/KR2021/005088.
(Continued)

*Primary Examiner* — Keith D Bloomquist
(74) *Attorney, Agent, or Firm* — Sughrue Mion, PLLC

(57) ABSTRACT

An electronic device includes: a display; a memory storing instructions; and a processor operatively connected with the display and the memory, and configured to execute the instructions to: control the display to display a first screen, based on a first user input, control the display to switch the first screen to a second screen, identify whether at least one input field in the first screen meets a specified condition, based on identifying the at least one input field meets the specified condition, identify a property of the at least one input field, based on a second user input, copy content included in the second screen, identify whether at least a portion of the copied content is applicable to the at least one input field based on the property of the at least one input field, and based on identifying the at least the portion of the copied content is applicable to the at least one input field, control the display to display a user interface for entering the at least the portion of the copied content in the at least one input field.

15 Claims, 14 Drawing Sheets

(51) Int. Cl.
*G06F 40/143* (2020.01)
*G06F 40/174* (2020.01)

(58) Field of Classification Search
CPC .......... G06F 3/04897; G06F 3/14; G06F 9/54;
G06F 3/0487; G06F 3/1431; G06F 9/543
See application file for complete search history.

(56) References Cited

U.S. PATENT DOCUMENTS

| | | | |
|---|---|---|---|
| 9,857,966 B2 | 1/2018 | Kim | |
| 11,132,115 B1* | 9/2021 | Brown | .................. G06F 3/0482 |
| 2005/0154994 A1* | 7/2005 | Chen | ........................ G06F 9/543 |
| | | | 715/822 |
| 2012/0246573 A1* | 9/2012 | Arokiaswamy | ....... G06F 40/166 |
| | | | 715/748 |
| 2014/0157168 A1* | 6/2014 | Albouyeh | ............... G06F 9/451 |
| | | | 715/770 |
| 2015/0026549 A1 | 1/2015 | Shao | |
| 2015/0142530 A1* | 5/2015 | Motamedi | ........ G06Q 10/06398 |
| | | | 705/7.42 |
| 2016/0224217 A1 | 8/2016 | Kim et al. | |
| 2016/0335239 A1* | 11/2016 | Brown | .................. H04M 1/724 |
| 2018/0032246 A1 | 2/2018 | Kim | |
| 2018/0260086 A1* | 9/2018 | Leme | .................... H04L 67/306 |

FOREIGN PATENT DOCUMENTS

| | | | |
|---|---|---|---|
| KR | 10-2009-0089601 A | | 8/2009 |
| KR | 10-2011-0006348 A | | 1/2011 |
| KR | 10-2014-0132950 A | | 11/2014 |
| KR | 10-2014-0140400 A | | 12/2014 |
| KR | 10-2015-0098096 A | | 8/2015 |
| KR | 10-2016-0093471 A | | 8/2016 |
| KR | 10-2017-0055227 A | | 5/2017 |
| KR | 10-2018-0013479 A | | 2/2018 |

OTHER PUBLICATIONS

Written Opinion (PCT/ISA/237) issued Aug. 9, 2021 by the International Searching Authority for International Patent Application No. PCT/KR2021/005088.

* cited by examiner

```
<!DOCTYPE html>
<html>
<body>

<form action="/action_page.php">
  Number only (between 1 and 5): <input type="number" name="quantity" min="1" max="5">
  <input type="submit">
</form>

</body>
</html>
```

411a · 413a

450a

Number only (between 1 and 5): [1]  SUBMIT

```
<!DOCTYPE html>
<html>
<body>

<form action="/action_page.php">
Add your homepage:<br>
<input type="url" name="homepage">
<input type="submit">
</form>

</body>
</html>
```

410b

411b

Add your homepage: [_____] [SUBMIT]

FIG. 4D 460d
451d
Email: [abc] [SUBMIT]
⚠ PLEASE INCLUDE '@' IN YOUR EMAIL ADDRESS
THERE IS NO '@' IN 'ABC'.
453d 410d
```
<!DOCTYPE html>
<html>
<body>
<form action="/action_page.php">
E-mail:
    <input type="email" name="email address">
    <input type="submit">
</form>
</body>
</html>
```
411d

ELECTRONIC DEVICE AND OPERATION METHOD OF ELECTRONIC DEVICE

CROSS-REFERENCE TO RELATED APPLICATIONS

This application is a by-pass continuation application of International Application No. PCT/KR2021/005088, filed on Apr. 22, 2021, which based on and claims priority to Korean Patent Application No. 10-2020-0050596, filed on Apr. 27, 2020, in the Korean Intellectual Property Office, the disclosures of which are incorporated by reference herein in their entireties.

BACKGROUND

1. Field

The disclosure relates to technologies of identifying an intention of a user and providing a user interface capable of entering content.

2. Description of Related Art

Recently, various types of electronic devices have been developed and distributed. The spread of mobile devices, such as smartphones, tablet PCs, and wearable devices as well as desktop PCs, which have various functions, have been expanded. Furthermore, recent electronic devices may support multi-tasking, may run a plurality of applications at the same time, or may provide a plurality of execution screens together in the same application. For example, the electronic device may display one of the plurality of execution screens on the entire screen and may execute the rest of the execution screens in the background. For example, the electronic device may perform an operation of copying and pasting content included in any execution screen in another execution screen while switching the execution screen depending on a user input.

For example, when a user wants to copy content included in another screen (e.g., a second screen) to enter data in an input field included in a first screen displayed on an electronic device, a series of operations of switching the displayed screen from the first screen to the second screen depending on a user input, copying content for being entered in a specified input field in the second screen, switching the second screen to the first screen again, and selecting an input field for entering the copied content and pasting the content should be repeatedly performed. For example, there are a plurality of user inputs (e.g., long press for selecting an item and an additional input for specifying a detailed area) to specify content to be copied on a touch screen, or a user input scheme for selecting content is often cumbersome and there is an inconvenience of having to copying and entering desired content one by one while repeatedly switching a screen. Furthermore, there is an inconvenience in which it is difficult to identify details associated with a previous screen (e.g., details of an input field or an application associated with the previous screen) and details associated with the current screen (e.g., the copied content or a portion matched with an input field in the copied content) at a time when switching the screen. For example, there is an inconvenience of having to accurately specifying content matched with the input field depending on a user input, when copying and pasting the content in the input field.

SUMMARY

Provided are an electronic device for providing a user interface capable of easily entering content displayed on a screen and a method thereof.

According to an aspect of the disclosure, an electronic device includes: a display: a memory storing instructions; and a processor operatively connected with the display and the memory, and configured to execute the instructions to: control the display to display a first screen, based on a first user input, control the display to switch the first screen to a second screen, identify whether at least one input field in the first screen meets a specified condition, based on identifying the at least one input field meets the specified condition, identify a property of the at least one input field, based on a second user input, copy content included in the second screen, identify whether at least a portion of the copied content is applicable to the at least one input field based on the property of the at least one input field, and based on identifying the at least the portion of the copied content is applicable to the at least one input field, control the display to display a user interface for entering the at least the portion of the copied content in the at least one input field.

The property of the input field may include at least one of a kind, a format, a property, and a type of content applicable to the at least one input field.

The specified condition may include at least one of the at least one input field is focused, the at least one input field is displayed on a specified area of the display, the at least one input field occupies the display over a specified area, and the first screen may include a plurality of input fields.

The user interface may include a button for switching the second screen to the first screen while entering the at least the portion of the copied content in the at least one input field.

The processor is further configured to execute the instructions to, based on all the copied content being matched with the property of the at least one input field, enter all the copied content in the at least one input field via the user interface.

The processor is further configured to execute the instructions to, based on a remaining portion of the copied content, in which a specified type of some content is removed from the copied content, being matched with the property of the at least one input field, enter the remaining portion of the copied content in the at least one input field via the user interface.

The processor is further configured to execute the instructions to, based on a plurality of portions applicable to the at least one input field being included in the copied content, control the display to display a button configured to selectively enter at least one of the plurality of portions in the at least one input field on the user interface.

The first screen may include a plurality of input fields, and the user interface may include a button configured to select the plurality of input fields.

The user interface may include at least one input field corresponding to the at least one input field of the first screen.

The first screen may include a hypertext markup language (HTML)-based web page, and the property of the at least one input field may include a property of a specified tag indicating an input field included in an HTML source of the HTML-based web page.

According to an aspect of the disclosure, a method of operating an electronic device, includes: displaying a first screen on a display of the electronic device: based on a first user input, switching the first screen to a second screen on the display; identifying whether at least one input field in the first screen meets a specified condition: based on identifying the at least one input field in the first screen meets the specified condition, identifying a property of the at least one input field; based on a second user input, copying content included in the second screen; identifying whether at least a portion of the copied content is applicable to the at least one input field based on the property of the at least one input field; and based on the at least the portion of the copied content being applicable to the at least one input field, displaying on the display a user interface for entering the at least the portion of the copied content in the at least one input field.

The specified condition may include at least one of the at least one input field is focused, the at least one input field is displayed on a specified area of the display, the at least one input field occupies the display over a specified area, and the first screen may include a plurality of input fields.

The method may further include, based on all the copied content being matched with the property of the at least one input field, entering all the copied content in the at least one input field via the user interface.

The method may further include, based on a remaining portion of the copied content, in which a specified type of some content is removed from the copied content, being matched with the property of the at least one input field, entering the remaining portion of the copied content in the at least one input field via the user interface.

The method may further include, based on a plurality of portions applicable to the at least one input field being included in the copied content, displaying a button configured to selectively enter at least one of the plurality of portions in the at least one input field on the user interface.

The user interface may include at least one input field respectively corresponding to at least one input field of the first screen, the first screen may include a plurality of input fields, and the user interface may include a button configured to select each of input fields of the user interface, which respectively correspond to the plurality of input fields.

The first screen may include a hypertext markup language (HTML)-based web page, and the property of the at least one input field may include a property of a specified tag indicating an input field included in an HTML source of the web page.

According to an aspect of the disclosure, an electronic device includes: a display: a memory storing instructions; and a processor operatively connected with the display and the memory, and configured to execute the instructions to: control the display to display a first screen, based on a first user input, control the display to switch the first screen to a second screen, identify whether at least one input field in the second screen meets a specified condition, based on identifying the at least one input field in the second screen meets the specified condition, identify a property of the at least one input field, extract content applicable to the at least one input field among pieces of content included in the first screen based on the property of the at least one input field, and control the display to display a user interface for entering the extracted content in the at least one input field.

According to one or more embodiments of the disclosure, a user interface capable of extracting and entering content suitable for an input field included in a current screen without switching the screen may be provided.

Further, according to one or more embodiments of the disclosure, a user interface capable of easily entering pieces of content matched with an input field included in the switched current screen among pieces of content included in the previous screen when switching the screen may be provided.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 illustrates an operation of an electronic device according to an embodiment;

FIGS. 4A to 4D illustrates an example of an operation of an electronic device according to various embodiments;

DETAILED DESCRIPTION

Figure 1:
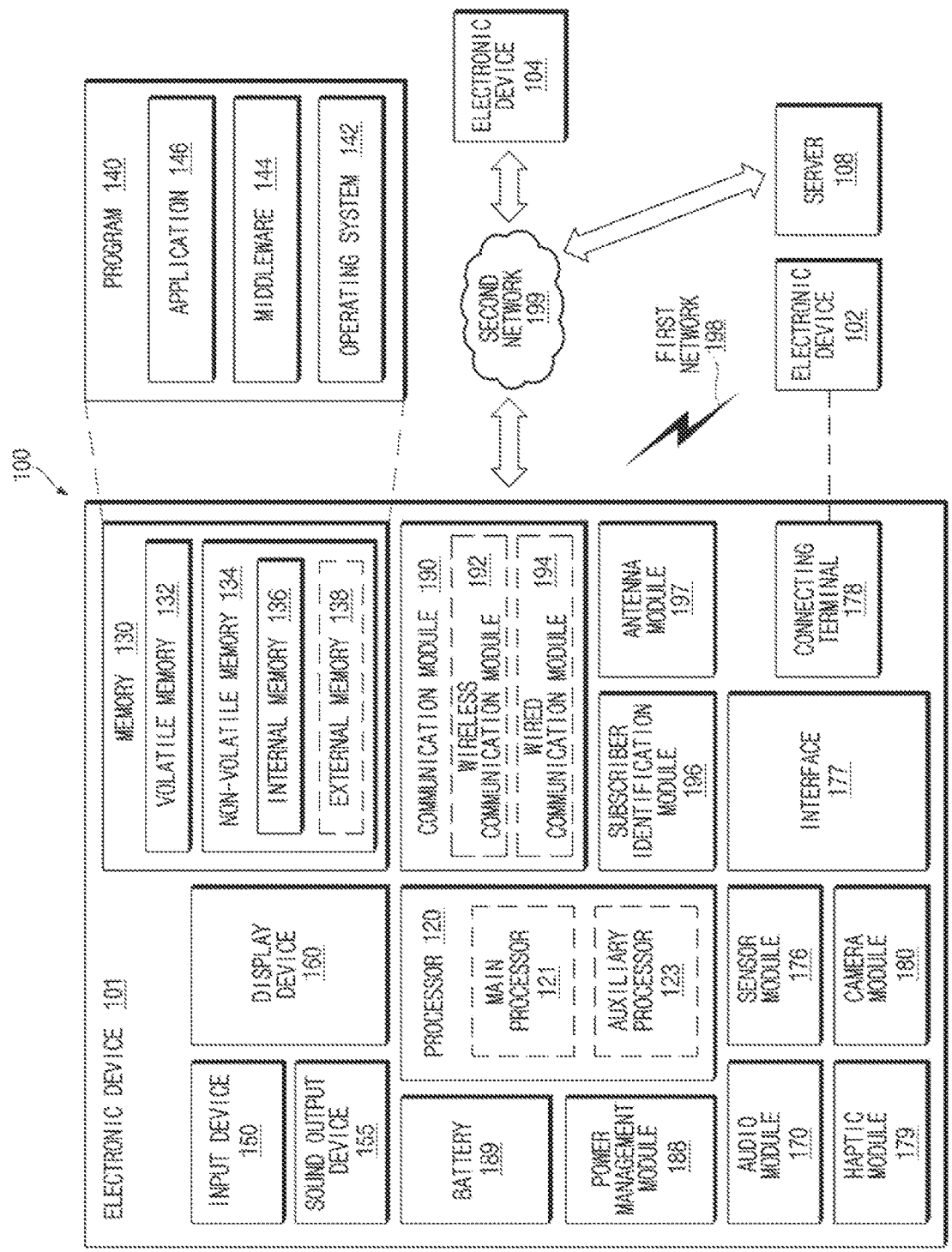
FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
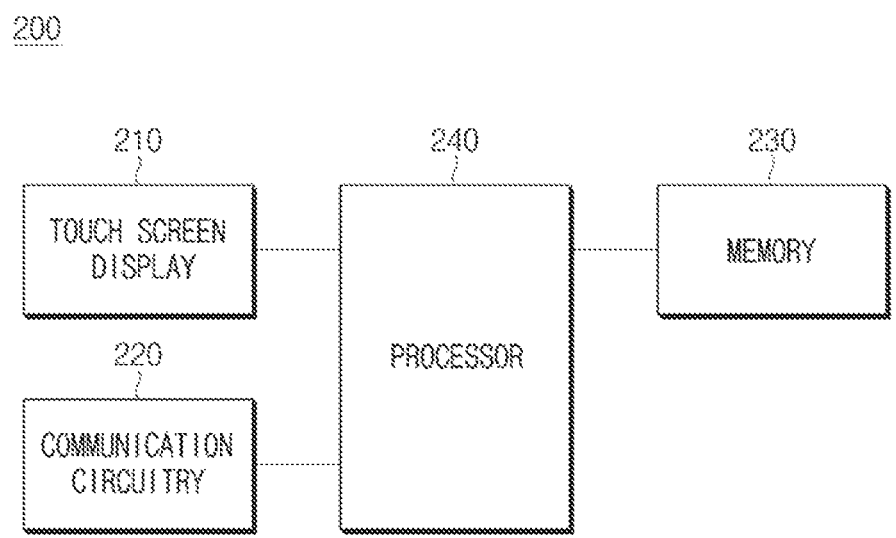
FIG. 2 is a block diagram of an electronic device according to an embodiment.

FIG. 2 is a block diagram of an electronic device 200 (e.g., an electronic device 101 of FIG. 1) according to an embodiment.

The electronic device 200 according to an embodiment may include a touch screen display 210, communication circuitry 220, a memory 230, and/or a processor 240.

According to an embodiment, the touch screen display 210 (e.g., a display device 160 of FIG. 1) may display a home screen and/or an application execution screen. For example, the touch screen display 210 may display a web page (e.g., a hypertext markup language (HTML)-based web page). According to an embodiment, the touch screen display 210 may switch the displayed screen under control of the processor 240. According to an embodiment, the screen displayed on the touch screen display 210 may include at least one content (e.g., copyable content) and/or at least one input field. According to an embodiment, the touch screen display 210 may output a user interface for entering at least a portion of copied content in an input field displayed on the screen under control of the processor 240 when switching the screen. According to various embodiments, FIG. 2 illustrates the touch screen display 210. However, the electronic device 200 may include a display (e.g., the display device 160 of FIG. 1) and an input device (e.g., an input device 150 of FIG. 1), which are independent of each other.

According to an embodiment, the communication circuitry 220 (e.g., a communication module 190 of FIG. 1) may transmit or receive data from an external device (e.g., an electronic device 200 or 102, an electronic device 200 or 104, or a server 108 of FIG. 1) over a network (e.g., a first network 198 or a second network 199 of FIG. 1). For example, the communication circuitry 220 may receive a web page from the external device or the server.

According to an embodiment, the processor 240 (e.g., a processor 120 of FIG. 1) may switch a first screen displayed on the touch screen display 210 to a second screen, in response to a first user input. For example, the processor 240 may switch a web page displayed on the touch screen display 210, in response to the first user input. For example, the processor 240 may switch an execution screen of an application, which is displayed on the touch screen display 210, in response to the first user input. For example, the processor 240 may control the touch screen display 210 to display another execution screen of the same application or display an execution screen of another application. According to an embodiment, when switching to the second screen, the processor 240 may execute the first screen (an application corresponding to the first screen) in the background.

According to an embodiment, the processor 240 may determine whether there is at least one input field in the first screen displayed on the touch screen display 210. According to an embodiment, when there is the at least input field in the first screen, the processor 240 may identify a property of the at least one input field included in the first screen. According to an embodiment, the property of the input field may include at least one of a kind, a format, a property, and a type of content applicable to the input field. For example, the first screen may include a hypertext markup language (HTML)-based web page. For example, the property of the input field included in the web page may include a property of a specified tag indicating the input field included in an HTML source of the web page. For example, the processor may analyze the HTML source to identify a property of the input field included in a web page screen.

According to an embodiment, when there is the at least input field in the first screen and when the at least one input field meets a specified condition, the processor 240 may identify a property of the at least one input field. According to an embodiment, the specified condition may include at least one of when the at least one input field is focused, when the at least one input field is displayed on a specified area of the display, when the at least one input field occupies the touch screen display 210 over a specified area, and when the first screen includes a plurality of input fields. For example, any input field included in the first screen is focused before the first screen switches to the second screen, when any input field is displayed on a specified area of a central portion of the touch screen display 210, when at least one input field occupies the touch screen display 210 over a specified area, or when there are a plurality of input fields, a user may have his or her intention for entering data in the corresponding input field when switching the screen. For example, the processor 240 may identify that the user has an intention to enter data in the input field based on whether the specified condition is met when switching the screen and may identify a property of the input field.

According to an embodiment, the processor 240 may copy at least a portion of content included in the second screen in response to a second user input. According to various embodiments, the processor 240 may at least temporarily store the copied content in the memory 230. For example, the processor 240 may store the copied content in a clipboard of the electronic device 200.

According to an embodiment, the processor 240 may determine whether at least a portion of the copied content is applicable to at least one input field based on the property of the at least one input field in response to the second user input. For example, the processor 240 may determine whether the at least a portion of the copied content is matched with the property of the at least one input field.

According to an embodiment, when both the first screen and the second screen are a web page, the processor 240 may determine whether the at least a portion of the copied content is matched with the property of the input field in the second screen based on a source code (e.g., an HTML source code) of the web page of the first screen and the second screen. For example, the processor 240 may compare or analyze at least a portion of a source code of the first screen corresponding to the input field and at least a portion of a source code of the second screen corresponding to the at least a portion of the copied content to determine whether the at least a portion of the copied content is matched with the property of the input field.

According to an embodiment, the processor 240 may capture the second screen and may recognize content (e.g., text) of the captured second screen, thus determining whether at least a portion of the content included in the captured second screen is matched with the property of the input field of the first screen. For example, the second screen may be a screen included in the application, which is different from the first screen, a screen in which a text copy is limited, or a screen including an image including text. In an embodiment, the processor 240 may recognize text included in content included in the captured second screen by using Optical Character Recognition (OCR). For another example, the processor 240 may recognize text included in the copied image by using OCR. For example, the processor 240 may recognize text included in content included in the captured second screen and may determine whether at least some of the recognized texts are matched with the property of the input field based on a relationship between the recognized texts. In an embodiment, when entering at least some of texts recognized on the second screen in the input field of the first screen, the processor 240 may use the at least some of texts. For example, the processor 240 may recognize text included in the second screen. When the recognized texts are "phone number" and "000-1111-5555" and when there is a "phone number" field among the input fields of the first screen, the processor 240 may enter "000-1111-5555" when entered in the input field or may guide to enter "000-1111-5555".

According to an embodiment, when copying at least some of texts included in the second screen, the processor 240 may obtain text information around the copied texts together. For example, when "phone number" and "000-1111-5555" are included in the second screen and when copying "000-1111-5555", the processor 240 may obtain "phone number" together and may use "phone number" and "000-1111-5555" to be matched with the property of the input field of the first screen.

According to an embodiment, the processor 240 may determine a property of the input field included in the execution screen of the application. For example, the processor 240 may identify a source code (e.g., an Android source code) used by the application. For example, a source code used by an Android-based application may include the property 'EditText' indicating a field capable of entering text and may include the property 'android:inputType' defining a content type capable of being entered in the input field. For example, the source code of the Android application may include the property 'phone' specifying an input method to be used for a phone number, and an input field for entering a password may include the property 'textPassword'. For example, a source code corresponding to the input field of the execution screen of the Android application may include at least one of various properties such as a property in which it is possible to enter only a number (e.g., when the code 'android:digits' is true), a property in which it is possible to enter a phone number (e.g., when the code 'android: phoneNumber' is true), or a property in which it is possible to enter a password (e.g., when the code android: password' is true). For example, the source code corresponding to the input field of the execution screen of the Android application may include a property for the maximum number of characters (e.g., 'android:maxLength') or a property for the number of lines capable of being entered (e.g., 'android: lines'). For example, the execution screen of the Android-based application may include a source code (e.g., 'android: digits') of the application corresponding to a source code of a web page (e.g., a 'number property' of an <input> field capable of inputting only a number). According to an embodiment, the processor 240 may determine whether the at least a portion of the copied content is matched with the property of the input field, based on the source code (e.g., an HTML source code) of the web page and/or the source code (e.g., an Android source code) of the application. For example, when the first screen and the second screen are an application execution screen and a web page or the web page or the application execution screen, respectively, the processor 240 may recognize source codes respectively corresponding to the first screen and the second screen and may compare and analyze the source codes which correspond to each other to determine whether the at least a portion of the copied content and the property of the input field are matched with each other.

According to an embodiment, when the at least a portion of the copied content is applicable to the at least one input field, the processor 240 may provide a user interface for entering the at least a portion of the copied content in the at least one input field on the display. For another example, when obtaining text from the captured second screen, the processor 240 may provide a user interface for entering at least a portion of the obtained text in the at least one input field on the display. According to an embodiment, the user interface may include an input field corresponding to at least one input field displayed on the first display, a button for switching the copied content, the input field, or a screen, and/or at least one button used to enter the at least a portion of the copied content in the input field.

According to an embodiment, the processor 240 may perform an autocomplete function on the user interface. For example, when all the copied content is matched with the property of the at least one input field, the processor 240 may enter all the copied content in the at least one input field on the user interface. For example, when the rest in which a specified type of some content is removed from the copied content is matched with the property of the at least one input field, the processor 240 may enter the rest in which the some content is removed in the at least one input field on the user interface. For example, when a plurality of portions applicable to the at least one input field are included in the copied content, the processor 240 may display a button configured to selectively enter at least one of the plurality of portions in the at least one input field on the user interface. For example, the processor 240 may selectively enter at least a portion of the copied content in the input field, based on a user input received on the button included in the user interface. For example, the processor 240 may select one of a plurality of input fields to enter at least a portion of the copied content based on the user input received on the button included in the user interface. According to an embodiment, the processor 240 may provide a user interface in a form where at least a portion of the copied content is entered to an input field corresponding to the input field included in the first screen. For example, the processor 240 may provide details of content to be entered in the input field of the first screen as a preview on the user interface.

According to an embodiment, the processor 240 may recognize text included in the copied content by using OCR, when the type of the copied content is not text, and may enter at least a portion of the recognized text in the input field on the user interface, when the at least a portion of the recognized text is matched with the property of the input field. For example, the processor 240 may recognize text included in the second screen or the copied content and may provide an autocomplete function of entering the at least a portion of the recognized text in the input field of the first screen on the user interface.

According to an embodiment, the processor 240 may provide a plurality of user interfaces. For example, the processor 240 may provide a first user interface, when copying first content for being entered in the input field of the first screen, and may provide a second user interface, when copying second content for being entered in the input field of the second screen. For example, the first and second user interfaces may correspond to different screens or different applications. For example, the processor 240 may provide a first user interface for entering the copied content in the input field of the first screen on the second screen and may additionally provide a second user interface for entering the copied content in an input field of a third screen (different from the first screen and the second screen). For example, the electronic device may provide a pin function of fixing the user interface to a screen. For example, the electronic device may fix the first user interface displayed on the screen to the screen based on the user input and may display the second user interface based on an additional user input (e.g., an input for copying new content or outputting a new user interface).

According to an embodiment, when automatically entering content in the input field of the first screen on the user interface, the processor 240 may switch the second screen displayed on the touch screen display 210 to the first screen. According to an embodiment, after entering the copied content in the input field, the processor 240 may determine whether to switch a screen based on a user input received on the button included in the user interface. For example, the processor 240 may maintain the second screen displayed after entering the at least a portion of the copied content in the input field of the first screen based on the user input received through the user interface or may switch the second screen to the first screen including the input field. For example, the processor 240 may focus or select at least one input field in which content is entered when switching to the first screen or may display the corresponding input field on a specified area of the display (e.g., a central portion of the display). For another example, when all are entered in the input field displayed on the first screen, the second screen may switch to the first screen.

According to an embodiment, the processor 240 may determine whether there is at least input field in the second screen in response to the first user input and may identify a property of the at least one input field, when the at least one input field meets a specified condition. For example, when the input field is included in the switched second screen, the processor 240 may identify a property of the input field included in the second screen. According to an embodiment, the processor 240 may extract content applicable to the at least one input field among pieces of content included in a screen included in the first screen based on the property of the at least one input field. According to an embodiment, the processor 240 may provide a user interface for entering the extracted content in the at least one input field on the touch screen display 210. According to an embodiment, the processor 240 may recognize text included in the first screen and may determine whether at least a portion of the recognized text is matched with a property of the input field of the second screen. For example, the processor 240 may capture the first screen and may recognize the text included in the captured first screen by using OCR. According to an embodiment, the processor 240 may provide an autocomplete function of automatically entering at least a portion of the recognized text, which is matched with the property of the input field, in the input field. According to an embodiment, the processor 240 may provide a user interface for entering the at least a portion of the recognized text, which is matched with the property of the input field, in the input field.

According to an embodiment, the memory 230 (e.g., a memory 130 of FIG. 1) may store instructions, when executed, causing the processor 240 to perform an operation of controlling the electronic device 200. According to an embodiment, the memory 230 may at least temporarily store copied at least some of pieces of content included in the screen displayed on the touch screen display 210. For example, the memory 230 may include a clipboard which stores the copied content. According to an embodiment, the memory 230 may at least temporarily store properties of input fields included in the screen displayed on the touch screen display 210. According to an embodiment, the property of the input field may include at least one of a kind, a format, a property, a context, and a type of content applicable to the at least one input field. For example, the property of the input field may include a property of a specified tag indicating an input field included in an HTML source of a web page.

According to various embodiments, the electronic device 200 may further include at least some of the components included in the electronic device 101 of FIG. 1.

According to an embodiment disclosed in the disclosure, an electronic device may include a display, a memory, and a processor operatively connected with the display and the memory. The memory may store instructions, when executed, causing the processor to display a first screen on the display, switch the first screen to a second screen, based on a first user input, determine whether there is at least one input field in the first screen, in response to the first user input, identify a property of the at least one input field, when the at least one input field meets a specified condition, copy at least a portion of content included in the second screen, based on a second user input, and determine whether at least a portion of the copied content is applicable to the at least one input field based on the property of the at least one input field, in response to the second user input.

According to an embodiment, the instructions may cause the processor to provide a user interface for entering the at least a portion of the copied content in the at least one input field, on the display, when the at least a portion of the copied content is applicable to the at least one input field.

According to an embodiment, the property of the at least one input field may include at least one of a kind, a format, a property, and a type of content applicable to the at least one input field.

According to an embodiment, the specified condition may include at least one of when the at least one input field is focused, when the at least one input field is displayed on a specified area of the display, when the at least one input field occupies the display over a specified area, and when the first screen includes a plurality of input fields.

According to an embodiment, the user interface may include a button for switching the second screen to the first screen while entering the at least a portion of the copied content in the at least one input field.

For example, the instructions may cause the processor to enter all the copied content in the at least one input field on the user interface, when all the copied content is matched with the property of the at least one input field.

For example, the instructions may cause the processor to, when the rest in which a specified type of some content is removed from the copied content is matched with the property of the at least one input field, enter the rest in which the some content is removed in the at least one input field on the user interface.

For example, the instructions may cause the processor to, when a plurality of portions applicable to the at least one input field are included in the copied content, display a button configured to selectively enter at least one of the plurality of portions in the at least one input field on the user interface.

According to an embodiment, when there are a plurality of input fields in the first screen, the user interface may include a button configured to select the plurality of input fields.

According to an embodiment, the user interface may include at least one input field corresponding to the at least one input field of the first screen.

According to an embodiment, the first screen may include a hypertext markup language (HTML)-based web page, and the property of the at least one input field may include a property of a specified tag indicating an input field included in an HTML source of the web page.

According to an embodiment disclosed in the disclosure, an electronic device may include a display, a memory, and a processor operatively connected with the display and the memory. The memory may store instructions, when executed, causing the processor to display a first screen on the display, switch the first screen to a second screen, based on a first user input, determine whether there is at least one input field in the second screen, in response to the first user input, identify a property of the at least one input field, when the at least one input field meets a specified condition, extract content applicable to the at least one input field among pieces of content included in a screen included in the first screen based on the property of the at least one input field, and provide a user interface for entering the extracted content in the at least one input field, on the display.

Figure 3:
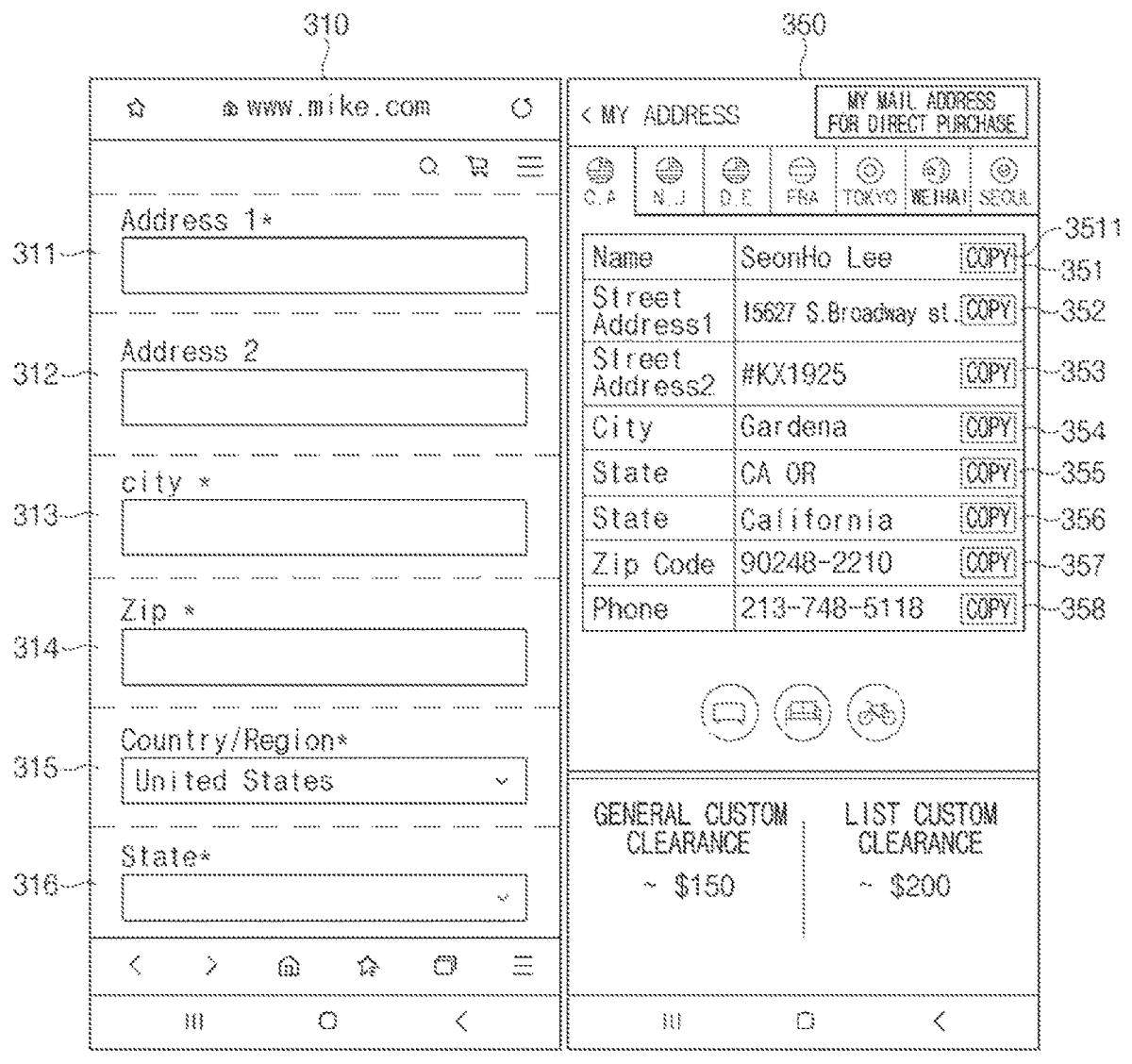

FIG. 3 is a drawing for describing an operation of an electronic device (e.g., an electronic device 101 of FIG. 1 or an electronic device 200 of FIG. 2) according to an embodiment. FIG. 3 is an example of a first screen 310 and a second screen 350 displayed on a display (e.g., a display device 160 of FIG. 1 or a touch screen display 210 of FIG. 2) by the electronic device.

For example, the first screen 310 may include at least one input field 311, 312, 313, 314, 315, and 316. For example, the first screen 310 may include a first input field 311 and a second input field 312 associated with a detailed address, a third input field 313 associated with a city, a fourth input field 314 associated with a zip code, a fifth input field 315 associated with a country/region, and/or a sixth input field 316 associated with a state.

For example, the second screen 350 may include at least one content 351, 352, 353, 354, 355, 356, 357, and 358 corresponding to the input fields 311, 312, 313, 314, 315, and 316 of the first screen 310. For example, the second screen 350 may include a first item 351 associated with a user name, a second item 352 and a third item 353 associated with an address, a fourth item 354 associated with a city, a fifth item 355 and a sixth item 356 associated with a state, a seventh item 357 associated with a zip code, and an eighth item 358 associated with a phone number. For example, each item 351, 352, 353, 354, 355, 356, 357, or 358 may include a copy button 3511 capable of copying content of the corresponding item 351, 352, 353, 354, 355, 356, 357, or 358. For example, when a user input is received on the copy button 3511 of the first item 351, the electronic device may copy a user name which is content of the first item 351.

According to an embodiment, the electronic device may identify presence of the input fields 311, 312, 313, 314, 315, and 316 included in the first screen 310 and/or properties of the input fields 311, 312, 313, 314, 315, and 316 when switching to the second screen 350, may determine whether content selected or copied by a user among the pieces of content 351, 352, 353, 354, 355, 356, 357, and 358 included in the second screen 350 is matched with the input field 311, 312, 313, 314, 315, or 316 of the first screen 310, and may provide a user interface capable of easily entering at least a portion of the copied content, which is matched with the property of the input field, in the input field even without iterative screen switching and a plurality of inconvenient user inputs.

FIGS. 4A to 4D are drawings for describing an operation of an electronic device (e.g., an electronic device 101 of FIG. 1 or an electronic device 200 of FIG. 2) according to various embodiments. In FIGS. 4A to 4D, the right is an example of input fields 451a, 451b, 451c, and 451d of screens 450a, 450b, 450c, and 450d, and the left is an example of source codes 410a, 410b, 410c, and 410d (e.g., HTML source codes) including properties 411a, 411b, 411c, 411d, and 413a of the input fields. For example, FIGS. 4A to 4D describe the case where the electronic device displays an HTML-based web page screen as an example, but embodiments of the disclosure are not limited thereto.

According to an embodiment, the electronic device may display screens 450a, 450b, 450c, and 450d including input fields 451a, 451b, 451c, and 451d. According to an embodiment, when the screen is switched or when the input field meets a specified condition together screen switching, the electronic device may identify the properties 411a, 411b, 411c, 411d, and 413a of the input fields 451a, 451b, 451c, and 451d. For example, the property 411a, 411b, 411c, 411d, or 413a of the input field 451a, 451b, 451c, or 451d may include a data type which may be entered or a type for entering data.

For example, the HTML source of the input field 451a, 451b, 451c, or 451d may include at least one of tag kinds (e.g., <input>, <textarea>, and <datalist>) indicating the input fields 451a, 451b, 451c, and 451d. For example, when the displayed screen is an HTML-based web page, it may be possible to enter only one-line text data, when the property 411a, 411b, 411c, 411d, or 413a (e.g., tag) of the input field 451a, 451b, 451c, or 451d is <input>, it may be possible to enter multiple lines of text data, when the property 411a, 411b, 411c, 411d, or 413a (e.g., tag) of the input field 451a, 451b, 451c, or 451d is <textarea>, and it may be possible to enter only predefined text data (e.g., text data predefined as <option value> may be set), when the property 411a, 411b, 411c, 411d, or 413a (e.g., tag) of the input field 451a, 451b, 451c, or 451d is <datalist>. For example, a property for a data type capable of being entered in the input field 451a, 451b, 451c, or 451d depending on settings when the property 411a, 411b, 411c, 411d, or 413a (e.g., tag) of the input field 451a, 451b, 451c, or 451d is <input> may include date, datetime-local, email, month, number, password, search, tel, text, or URL. For example, the property 411a, 411b, 411c, 411d, or 413a for the data type capable of being entered in the input field 451a, 451b, 451c, or 451d may be defined according to a screen displayed by the application and/or the electronic device.

For example, the property of the input field included in the HTML-based web page screen may have the following features.

date: the format of [YYYY-MM-DD] is applied. For example, a text type which permits only the number such as 2019-05-02 and '-' is supported. It is possible to omit '-'. However, an order of formats may be changed according to a country, a language, or the like.

month: the format of [YYYY-MM] is applied. For example, a text type which permits only the number such as 2019-05 and '-' is supported. It is possible to omit '-'. However, an order of formats may be changed according to a country, a language, or the like.

email: the format of [string(@)string.string] is applied. For example, abc@ abc.com may be used. The final (.string) portion may be omitted or may be repeated a plurality of times. The character '(@)' should be used only once, which may not be located first or last.

number: it is possible to use only a number. Furthermore, the range of values capable of being entered by a min value and a max value which are a detailed property thereof may be limited.

password: it is possible to use all strings.

search: it is possible to use all strings.

tel: it is possible to use only a number and '-'. For example, when the regular expression '[0-9]{3}-[0-9]{2}-[0-9]{3}' is defined by using the property 'pattern' together, a corresponding format may be applied. For example, in the regular expression, three of numbers from 0 to 9, a subsequent hyphen '-' sign, subsequent two of the numbers from 0 to 9, a subsequent hyphen '-' sign, and subsequent three of the numbers from 0 to 9 may be located.

text: it is possible to use all strings.

datetime-local: YYYY-MM-DDTHH:MM as a default format is applied. A number, the hyphen '-', the colon ':', the English letter "T" may be used. For example, "2017-06-01T08:30" may be used as a value capable of being actually entered. However, an order of formats may be changed according to a country, a language, or the like.

time: HH:MM is applied as a default format. A number and the colon ':' may be used. For example, a value of "08:30" may be used.

url: A URL format is applied.

For example, in FIG. 4A, it may be possible to enter only a number between from 1 to 5 in the first input field 451a. For example, a "number" may be set as the property 411a (e.g., an input type) indicating a data type of the first input field 451a, and values ("1" and "5") for the property 413a (e.g., min and max) indicating a type for entering data may be set.

For example, in FIG. 4B, it may be possible to enter only a home page (URL) in the second input field 451b. For example, a "url" may be set as the property 411b indicating a data type of the second input field 451b.

Figure 4C:
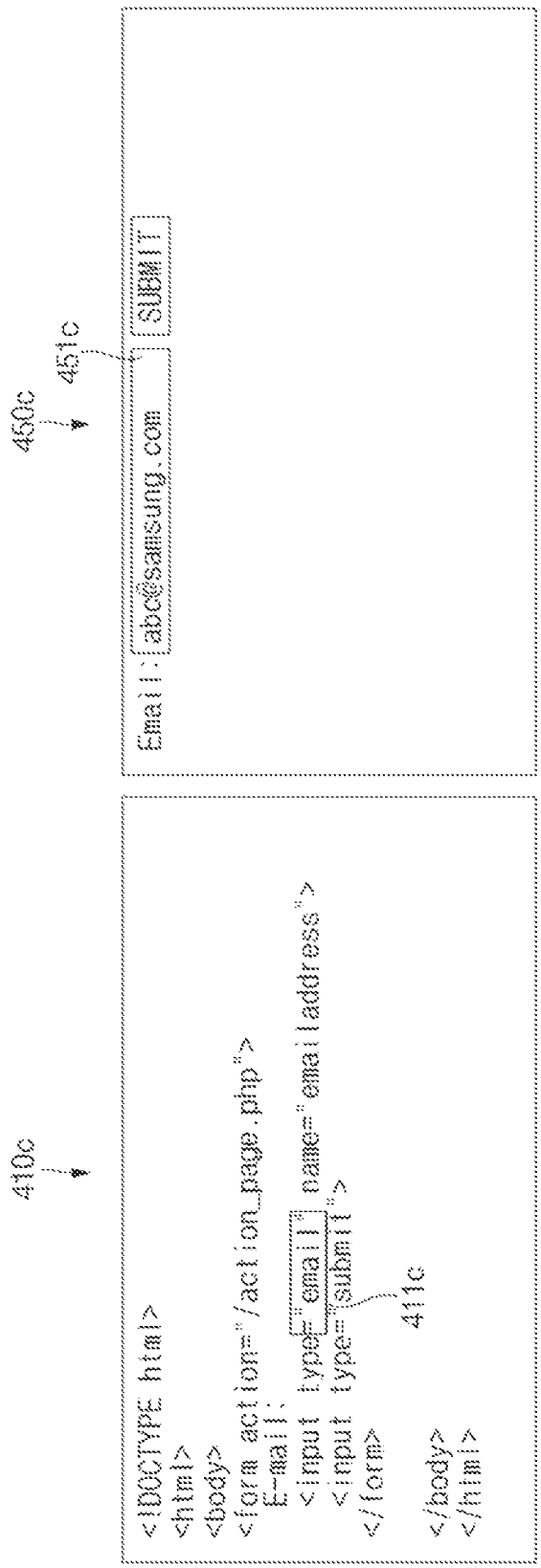

For example, in FIG. 4C, it may be possible to enter only an email in the third input field 451c. For example, an "email" may be set as the property 411c indicating a data type of the third input field 451c.

For example, in FIG. 4D, it may be possible to enter only an email in the fourth input field 451d as shown in FIG. 4C. For example, an "email" may be set as the property 411d indicating a data type of the fourth input field 451d. For example, when data not matched with the property 411d set in the fourth input field 451d is entered in the fourth input field 451d, a notification 453d indicating that the input data is inappropriate may be displayed.

According to an embodiment, when switching a first screen to a second screen, the electronic device may identify the property 411a, 411b, 411c, 411d, or 413a of the input field 451a, 451b, 451c, or 451d included in the first screen and may determine whether at least a portion of content, which is copied based on a user input, among pieces of content included in the second screen is matched with the property 411a, 411b, 411c, 411d, or 413a of the input field 451a, 451b, 451c, or 451d included in the first screen. According to an embodiment, when the at least a portion of the copied content is matched with the property of the input field 451a, 451b, 451c, or 451d, the electronic device may provide a user interface for entering the at least a portion of the copied content in the input field 451a, 451b, 451c, or 451d. Hereinafter, a description will be given of examples of a user interface provided by an electronic device with reference to FIGS. 5 to 7.

Figure 5:
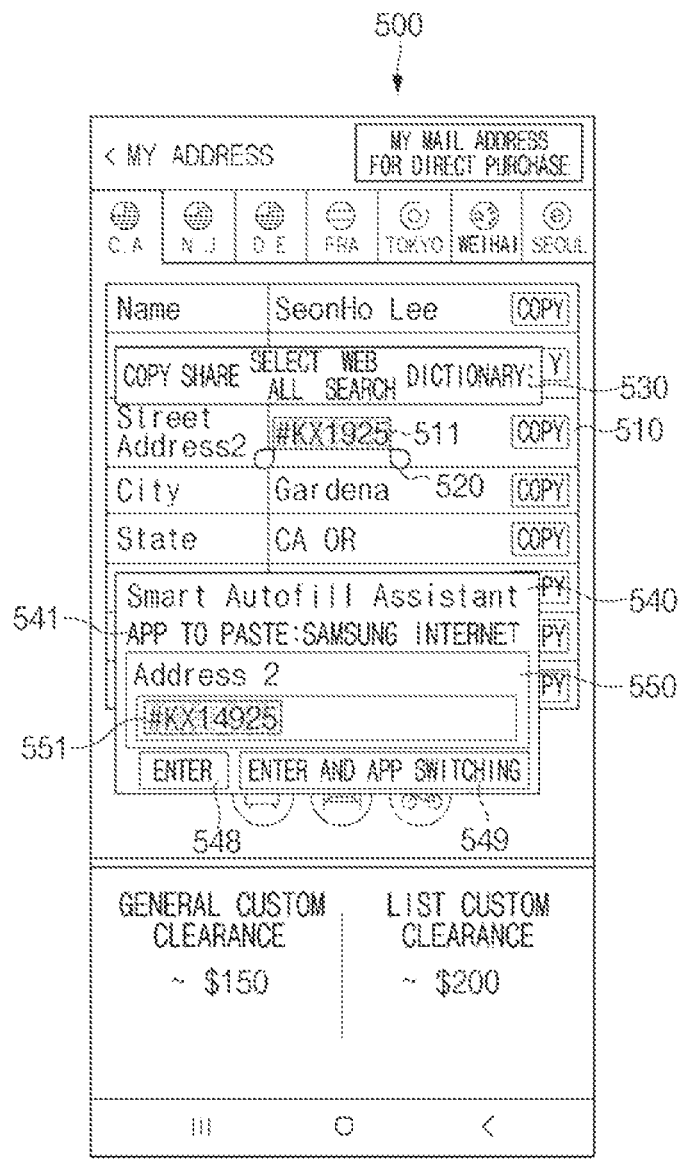
FIG. 5 illustrates a user interface provided by an electronic device according to an embodiment.

FIG. 5 illustrates that a user interface 540 provided by an electronic device (e.g., an electronic device 101 of FIG. 1 or an electronic device 200 of FIG. 2) according to an embodiment. For example, FIG. 5 illustrates an example of a user interface 540 provided to a second screen 500 when an electronic device switches a screen displayed on a display (e.g., a display device 160 of FIG. 1 or a touch screen display 210 of FIG. 2) from a first screen (e.g., a first screen 310 of FIG. 3) to the second screen 500 (e.g., a second screen 350 of FIG. 3).

According to an embodiment, the electronic device may select and/or copy at least a portion 511 of content included in the second screen 500 based on a user input. For example, the second screen 500 may include first content 510 (e.g., an item associated with an input field) associated with an input field of the first screen. For example, the first content 510 may include second content 511.

According to an embodiment, the electronic device may select the second content 511 in the first content 510 displayed on the second screen 500 based on the user input. For example, the first content 510 may be a portion of content displayed on the second screen 500. For example, the second content 511 may be at least a portion of the first content 510. For example, third content 551 may be at least a portion of the second content 511. For example, the third content 551 may be at least a portion matched with a property of an input field of the first screen in the copied second content 511. According to an embodiment, the third content 551 may be entered or displayed on an input field 550 corresponding to an input field included in the first screen of the user interface 540. According to an embodiment, the electronic device may receive a user input for specifying the second content 511 which is at least a portion of the first content 510 displayed on the second screen 500. For example, the second content 511 selected based on the user input may be highlighted to indicate the selected state. According to an embodiment, the electronic device may display an indication 520 for adjusting a range of the selected second content 511. For example, the electronic device may adjust a range of the selected second content 511 based on a user input for the indication 520. According to an embodiment, a menu 530 indicating functions executable in conjunction with the second content 511 selected on the second screen 500 may be displayed in response to the selection of the second content 511. According to an embodiment, the electronic device may perform at least one function included in the menu 530 using the selected second content 511 based on the user input. For example, the electronic device may copy the selected second content 511 based on the user input. For example, the electronic device may store the copied second content 511 in its memory. For example, the second content 511 may be content selected and copied from the second screen 500 based on the user input.

According to an embodiment, when the copied content is not a text type (e.g., when the copied content is a specific area and/or an image), the electronic device may recognize text included in the copied content. For example, the electronic device may recognize text included in content to be copied by using OCR. For example, the electronic device may capture a second screen may recognize text included in the captured second screen (e.g., text included in content to be copied and/or text around the content to be copied) by using OCR. For example, the electronic device may determine whether at least a portion of the copied content is matched with a property of an input field, based on the recognized text.

According to an embodiment, the electronic device may determine whether the at least a portion of the copied second content 511 is applicable to an input field included in the first screen, based on the property of the input field (e.g., an input field 311, 312, 313, 314, 315, or 316 of FIG. 3 or an input field 451a, 451b, 451c, or 451d of FIG. 4). For example, the electronic device may determine whether the at least a portion of the copied second content 511 is matched with the property of the input field included in the first screen. For example, when the first screen (e.g., a first screen 310 of FIG. 3) and the second screen 500 (e.g., a second screen 350 of FIG. 3) are web page screens, the electronic device may analyze a source code (e.g., an HTML source code) of the first screen and/or a source code of the second screen 500 and may determine whether the property of the input field included in the first screen and the second content 511 copied from the second screen 500 are matched with each other. According to an embodiment, the electronic device may recognize content around the copied second content 511 and may determine whether the property of the input field of the first screen and the second content 511 are matched with each other based on the recognized content. For example, the electronic device may identify whether "Address2" among the source codes of the copied second content 511 and "Address2" of the input field included in the first screen are matched with each other. For another example, the electronic device may capture the second screen 500 and may perform an analysis (e.g., an OCR analysis) of the captured screen to analyze text included in the second screen 500. For example, the electronic device may determine whether the property of the input field included in the first screen and the second content 511 are matched with each other based on the text included in the second screen 500. According to an embodiment, when the at least a portion of the copied second content 511 is applicable to the input field of the first screen, the electronic device may display the user interface 540 for entering the at least a portion of the copied second content 511 in the input field of the first screen on the second display 500. According to an embodiment, the electronic device may display the user interface 540 in the form of a pop-up window on the second screen 500. According to an embodiment, the electronic device may provide content to be entered in the input field of the first screen as a preview on the user interface 540. FIG. 5 illustrates that all of the copied second content 511 is matched with the property of the input field, but an embodiment of the disclosure is not limited thereto. Even when the at least a portion of the copied second content 511 is matched with the property of the input field, the electronic device may provide the user interface 540.

According to an embodiment, the user interface 540 provided by the electronic device may include information 541 of an application to paste the copied second content 511. For example, when the first screen is a web page screen executed in an Internet browser application, the user interface 540 may include information 541 indicating that the application to paste the copied second content 511 is an Internet application.

According to an embodiment, the user interface 540 may include the input field 550 corresponding to the input field included in the first screen. For example, when an input field associated with an address is included in the first screen, the user interface 540 may include the input field 550 associated with the address to correspond to the first screen. According to an embodiment, when a plurality of input fields are included in the first screen, the electronic device may display the input field 550 corresponding to an input field meeting a specified condition in the first screen on the user interface 540. For example, when a specific input field is selected or focused before switching from the first screen to the second screen 500, the electronic device may display the input field 550 corresponding to an input field selected or focused in the first screen on the user interface 540.

According to an embodiment, the electronic device may enter the third content 551, which is the at least a portion of the copied second content 511, in the input field of the first screen on the user interface 540. For example, when the input field included in the first screen is an input field associated with an address and when the at least a portion of the copied second content 511 is matched with the property of the input field of the first screen, the electronic device may display the third content 551, which is the at least a portion of the copied second content 511, in the form of being entered in the input field 550 of the user interface 540. For example, FIG. 5 illustrates the case where the third content 551 is the same as the second content 511. However, the third content 551 entered in the input field 550 of the user interface 540 may be a portion of the second content 511.

According to an embodiment, the user interface 540 may include an enter button 548 and/or an enter and app switching button 549. According to an embodiment, the electronic device may enter the third content 551 displayed (or entered) on the user interface 540 in the corresponding input field of the first screen based on receiving a user input on the enter button 548. According to an embodiment, the electronic device may enter the copied content 551 displayed on the user interface 540 in the corresponding input field of the first screen based on receiving a user input on the enter and app switching button 549 and may switch the second screen 500 displayed on the display to the first screen. According to an embodiment, the electronic device may display the input field of the first screen in which the third content 551 is entered on a specified area of the display (e.g., the center of the display) when switching the second screen 500 to the first screen or may display the corresponding input field in the focused state or the selected state.

According to an embodiment of the disclosure, the electronic device may provide the user interface 540 in which the third content 551 is automatically entered in the second screen 500, based on the property of the input field included in the first screen on the user interface 540, such that a user easily identifies an input field included in the first screen, content to copy/paste, a state where content is entered in the input field, and/or information of an application to be run and easily copies and pastes content. For example, according to an embodiment of the disclosure, the user may identify or select an input field or may easily enter content corresponding to the input field, without the necessity of repeatedly switching a screen to select content to copy.

Figure 6:
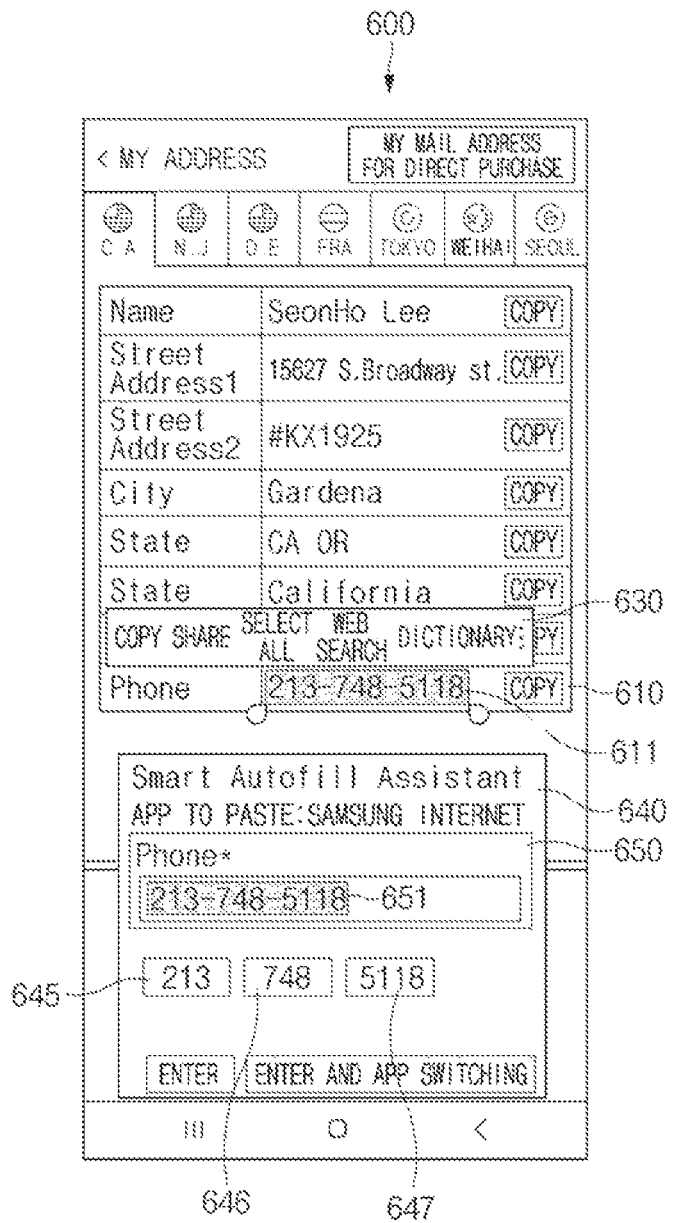
FIG. 6 illustrates a user interface provided by an electronic device according to an embodiment.

FIG. 6 illustrates that a user interface 640 provided by an electronic device (e.g., an electronic device 101 of FIG. 1 or an electronic device 200 of FIG. 2) according to an embodiment. For example, FIG. 6 illustrates an example of the user interface 640 provided to a second screen 600 when the electronic device switches a screen displayed on a display from a first screen to a second screen 600. Hereinafter, a portion duplicated with the description of FIG. 5 will be briefly described or omitted.

According to an embodiment, the electronic device may select and/or copy at least a portion (e.g., second content 611) of content (e.g., first content 610) included in the second screen based on a user input.

According to an embodiment, the electronic device may determine whether at least a portion of copied second content 611 is matched with a property of an input field included in the first screen, based on a property of an input field (e.g., an input field 311, 312, 313, 314, 315, or 316 of FIG. 3 or an input field 451*a*, 451*b*, 451*c*, or 451*d* of FIG. 4).

According to an embodiment, when the at least a portion of the copied second content 611 is applicable to the input field of the first screen, the electronic device may display a user interface 640 for entering third content 651, which is the at least a portion of the copied second content 611, in the input field of the first screen on the second display 600. According to an embodiment, the user interface 640 provided by the electronic device may include an input field 650 corresponding to the input field included in the first screen. For example, when an input field associated with a phone number is included in the first screen, the user interface 640 may include the input field 650 associated with the phone number to correspond to the first screen. According to an embodiment, the electronic device may enter the at least a portion (e.g., the third content 651) of the copied second content 611 in the input field of the first screen on the user interface 640. For example, when the input field of the first screen is an input field associated with a phone number and when the third content 651 which is the at least a portion of the copied content 511 is matched with the property of the input field of the first screen, the electronic device may display the third content 651 in the form of being entered in the input field 650 of the user interface 640. For example, FIG. 6 illustrates that the third content 651 is the same as the second content 611. However, the third content 651 entered in the input field 650 of the user interface 640 may be a portion of the second content 611.

According to an embodiment, the electronic device may determine whether at least a portion of the third content 651 is matched with the property of the input field associated with the phone number of the first screen. For example, the electronic device may identify a portion including a number, "–", and/or "+" corresponding to the format of the phone number in the third content 651. According to an embodiment, when one portion matched with the property of the input field is included in the third content 651, the electronic device may display the one portion of the third content 651 matched with the property of the input field in the form of being entered in the input field 650 of the user interface 640. According to an embodiment, when a plurality of portions matched with the property of the input field are included in the third content 651, the electronic device may display buttons 645, 646, and 647 configured to selectively enter at least one of the plurality of portions in the input field 650 of the user interface (or the input field of the first screen) on the user interface 640. For example, a plurality of portions "213", "748", and "5118" applicable to the input field of the first screen may be included in the third content "213-748-5118" 651. According to an embodiment, the user interface 640 may include the buttons 645, 646, and 647 capable of selectively entering the plurality of portions "213", "748", and "5118", respectively, which are applicable to the input field of the first screen. According to an embodiment, the electronic device may enter a portion of content corresponding to the selected buttons 645, 646, and 647 in the input field 650 of the user interface 640, based on the user input which is input to the buttons 645, 646, and 647. For example, the electronic device may enter a portion "213" of content corresponding to the first button 645 in the input field 650 of the user interface, when the first button 645 is selected, may enter a portion "748" of content corresponding to the second button 646 in the input field 650 of the user interface, when the second button 646 is selected, and may enter a portion "5118" of content corresponding to the third button 647 in the input field 650 of the user interface, when the third button 647 is selected.

Figure 7:
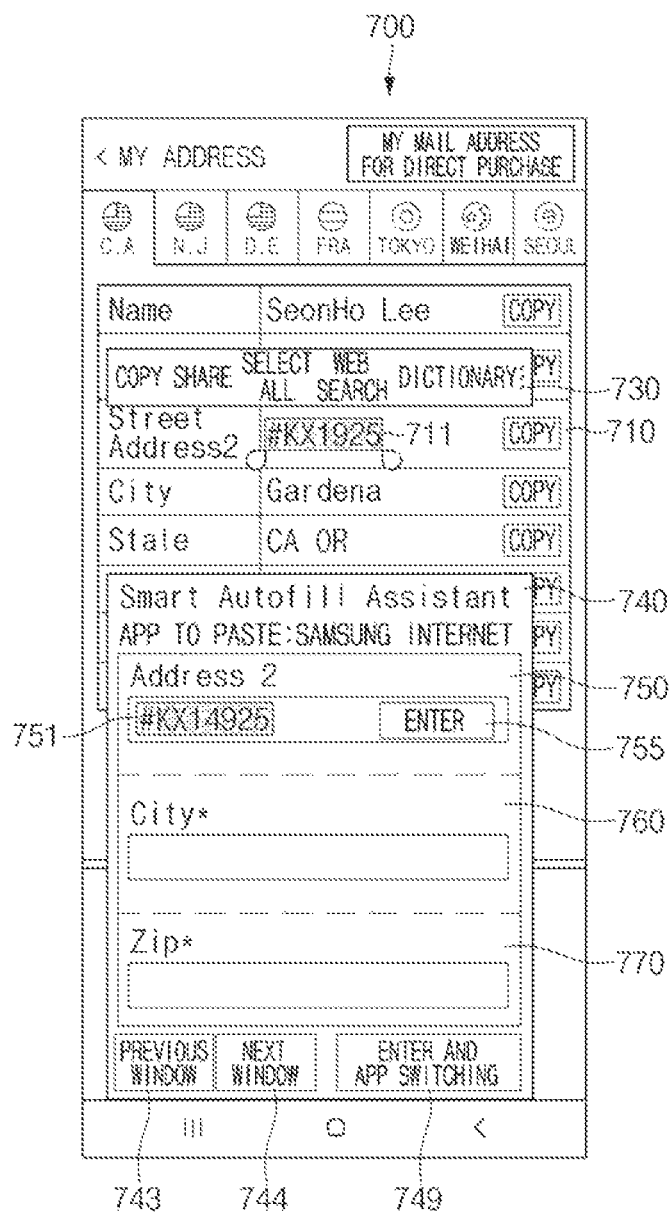
FIG. 7 illustrates a user interface provided by an electronic device according to an embodiment.

FIG. 7 illustrates that a user interface 740 provided by an electronic device (e.g., an electronic device 101 of FIG. 1 or an electronic device 200 of FIG. 2) according to an embodiment. For example, FIG. 7 illustrates an example of the user interface 740 provided to a second screen 700 when the electronic device switches a screen of a display from a first screen to a second screen 700. Hereinafter, a portion duplicated with the description of FIG. 5 or 6 will be briefly described or omitted.

According to an embodiment, when an input field included in a first screen is plural in number, the user interface 740 provided by the electronic device may include input fields 750, 760, and 770 corresponding to the plurality of input fields of the first screen. For example, it is assumed that the input field of the first screen includes an input field associated with an address, a city, and/or a zip code in FIG. 7, but embodiments of the disclosure are not limited thereto. For example, the input field associated with the address, the city, and/or the zip code is included in the first screen, the user interface 740 may include an input field 750 associated with the address, an input field 760 associated with the city, and/or an input field 770 associated with the zip code to correspond to the first screen. According to an embodiment, the electronic device may select and/or copy at least a portion (e.g., second content 711) of content (e.g., first content 710) included in a second screen based on a user input. According to an embodiment, the electronic device may determine whether at least a portion of the copied second content 711 is matched with a property of each of the plurality of input fields of the first screen.

According to an embodiment, when the at least a portion of the copied second content 711 is matched with a property of at least one input field included in the first screen, the electronic device may display third content 751, which is at least a portion of the copied second content 711, in the form of being entered in the input field 750 of the matched user interface 740. According to an embodiment, when there are a plurality of input fields with which at least a portion of the copied content 751 is matched in the user interface 740, the electronic device may enter the third content 751 matched with the corresponding input fields 750, 760, and 770 at a time. For example, when the copied content is a phone number and when an input field of a property to which a format associated with the phone number is applied is plural in number, the electronic device may provide the user interface 740 in the form of collectively entering the phone number in the corresponding input fields. For example, FIG. 7 illustrates the case where the third content 751 is the same as the second content 711. However, the third content 751 entered in the input fields 750, 760, and 770 of the user interface 740 may be a portion of the second content 711, and pieces of the third content 751 respectively entered in the input fields 750, 760, and 770 may be determined to be different from each other based on properties of the input fields 750, 760, and 770. For example, although pieces of the copied second content 711 are the same each other, the pieces of third content 751 respectively entered in the input terminals 750, 760, and 770 may be different from each other.

According to an embodiment, the electronic device may provide the user interface 740 in the form of entering the third content 751, which is at least a portion of the copied second content 711, in one of the plurality of input fields 750, 760, and 770. According to an embodiment, the electronic device may include buttons 743 and 744 capable of switching an input field on the user interface 740. For example, the electronic device may change an input field selected (or focused) on the user interface 740 based on a user input received on the button 743 or 744. For example, the electronic device may select an input field before the currently selected input field based on the user input received on the previous button 743 or may select an input field after the currently selected input field based on the user input received on the next button 744. For example, the electronic device may select at least one of the input fields 750, 760, and 770 to enter the third content 751 based on the user input on the button 743 or 744.

According to an embodiment, the electronic device may include an enter and app switching button 749 on the user interface 740. According to an embodiment, the electronic device may enter the third content 751 in the plurality of input fields of the first screen on the user interface 740 based on a user input received on the enter and app switching button 749 and may switch the second screen 700 to the first screen.

According to an embodiment of the disclosure, the electronic device may provide the user interface 740 capable of easily entering content copied from the second screen in each of the plurality of input fields included in the first screen. For example, according to an embodiment of the disclosure, as a user is able to repeatedly switch the screen to copy and paste content in the plurality of input fields included in the screen or easily identify details of an input field included in another screen, copied content, and a portion of the copied content entered in the input field even without entering a plurality of user inputs, the convenience of the user may increase.

Figure 8:
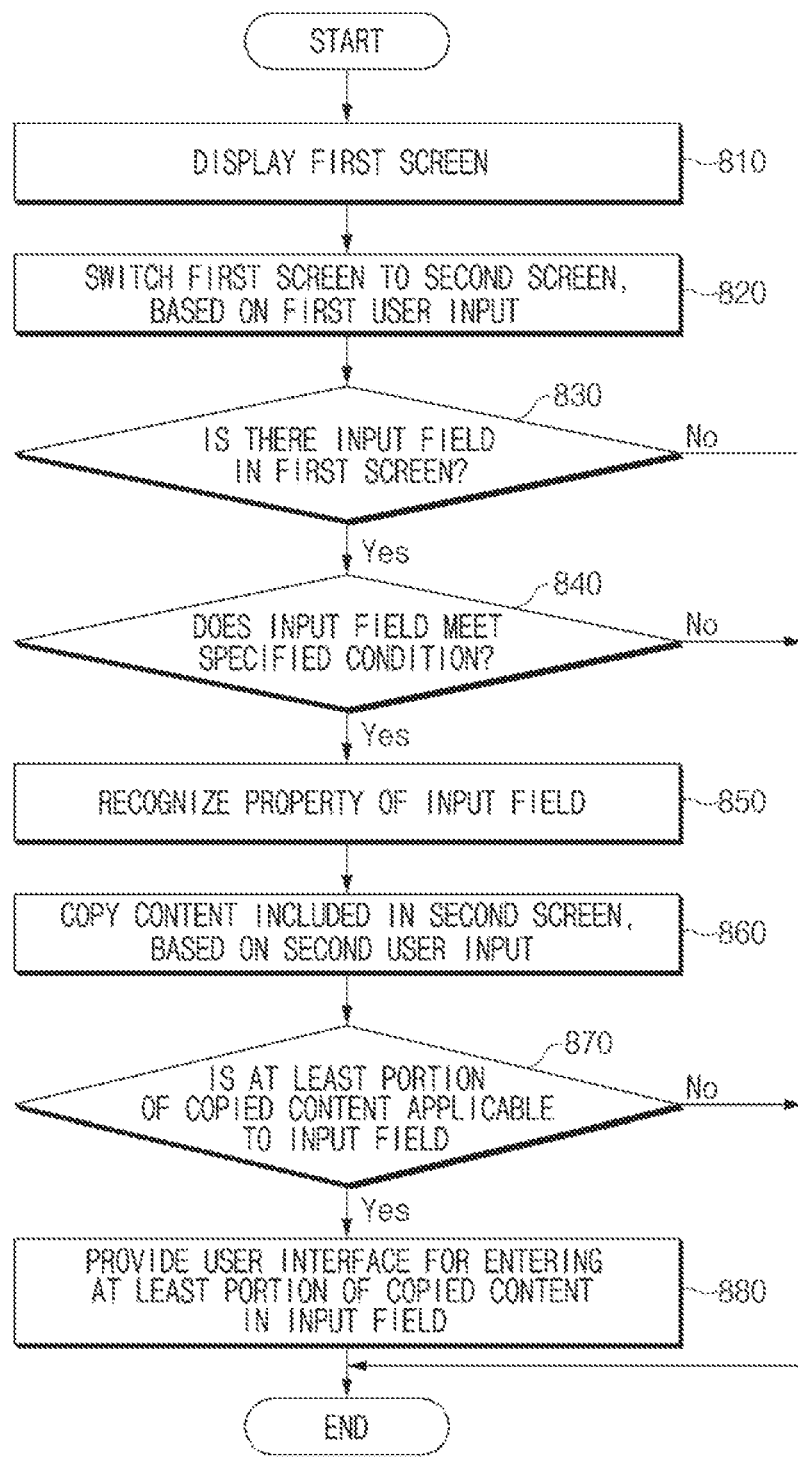
FIG. 8 illustrates a method for providing a user interface in an electronic device according to an embodiment.

FIG. 8 illustrates a method for providing a user interface in an electronic device (e.g., an electronic device 101 of FIG. 1 or an electronic device 200 of FIG. 2) according to an embodiment.

According to an embodiment, in operation 810, the electronic device may display a first screen. For example, the electronic device may display an execution screen of an application. For example, the electronic device may execute an Internet application to display an HTML-based web page.

According to an embodiment, in operation 820, the electronic device may switch the first screen (e.g., a first screen 310 of FIG. 3) to a second screen (e.g., a second screen 350 of FIG. 3) based on a first user input. For example, the electronic device may switch the execution screen of the first application to an execution screen of a second application different from the first application or may switch the first screen executed in the same application to the second screen. For example, the electronic device may switch a first web page screen to a second web page screen.

According to an embodiment, in operation 830, the electronic device may determine whether there is at least one input field in the first screen. According to an embodiment, the electronic device may perform operation 840, when there is the input field in the first screen, and may fail to provide a user interface according to an embodiment of the disclosure, when there is no input field in the first screen.

According to an embodiment, in operation 840, the electronic device may determine whether the at least one input field included in the first screen meets a specified condition. According to an embodiment, the specified condition may include at least one of when the at least one input field is focused in the first screen, when the at least one input field is displayed on a specified area of the display, when the at least one input field occupies the display over a specified area, and when the first screen includes a plurality of input fields. For example, the electronic device may determine whether the input field included in the first screen meets the specified condition before switching the first screen to the second screen. According to an embodiment, operation 850 may be performed, when the input field meets the specified condition, and the user interface according to an embodiment of the disclosure may fail to be provided, when the input field does not meet the specified condition. According to an embodiment, operation 840 may be an optional operation, which may be omitted. For example, when operation 840 is omitted, the electronic device may perform operation 850 when there is the input field in the first screen.

According to an embodiment, in operation 850, the electronic device may identify a property of the at least one input field which is included in the first screen and meets the specified condition. According to an embodiment, the property of the input field may include at least one of a kind, a format, a property, and a type of content applicable to the at least one input field. According to an embodiment, the electronic device may at least temporarily store the identified property of the input field in its memory. For example, the electronic device may store the property of the input field as metadata of the input field. For example, when the first screen is a web page, the electronic device may recognize the property of the input field based on a source code corresponding to the input field among source codes (e.g., HTML source codes) of the web page. For example, the electronic device may capture the first screen and may recognize text included in the first screen by using OCR. For example, the electronic device may recognize the property of the input field based on text corresponding to the input field among the recognized texts. For example, when the first screen is an execution screen of an application, the electronic device may recognize the property of the input field based on the source code corresponding to the input field among source codes (e.g., Android source codes) used in the application.

According to an embodiment, the electronic device may perform operations 830 to 850 before operation 820. For example, the electronic device may determine whether there is an input field in the first screen before the first screen switches to the second screen, may determine whether the input field of the first screen meets the specified condition, and may identify and store the property of the input field of the first screen.

According to an embodiment, in operation 860, the electronic device may copy at least a portion of content included in the second screen based on a second user input. According to an embodiment, the electronic device may at least temporarily store at least a portion of the copied content in the memory. According to an embodiment, when the copied content is not a text type (e.g., when the copied content is a portion of the second screen or an image), the electronic device may recognize text included in the content to be copied. For example, the electronic device may capture the second screen and may recognize content included in the captured second screen (e.g., text included in content to be copied or text around the content to be copied) by using OCR.

According to an embodiment, in operation 870, the electronic device may determine whether the at least a portion of the copied content is applicable to the at least one input field of the first screen. For example, the electronic device may determine whether all the copied content is matched with the property of the at least one input field, whether the rest in which a specified type of some content is removed from the copied content is matched with the property of the at least one input field, or whether the at least a portion of the copied content is matched with the property of the at least one input field.

For example, when the first screen is an HTML-based web page screen, the electronic device may determine whether the at least a portion of the copied content is matched with the input field based on a property of an input field included in a web page screen based on an HTML source (e.g., a tag and setting of the HTML source).

For example, when recognizing text included in the second screen (e.g., text included in the copied content or text around the copied content), the electronic device may determine whether the copied content is matched with the property of the input field of the first screen based on the recognized text. For example, when the second screen and/or content to be copied is an image, the electronic device may recognize text included in the image to be copied and may determine whether at least a portion of the recognized text is matched with the property of the input field.

According to an embodiment, in operation 880, the electronic device may provide a user interface (e.g., a user interface 540 of FIG. 5, a user interface 640 of FIG. 6, or a user interface 740 of FIG. 7) for entering the at least a portion of the copied content in the input field.

For example, the electronic device may enter the copied content in the input field on the user interface. For example, the electronic device may recognize at least a portion of text included in the copied content and may enter at least a portion of the recognized text in the input field on the user interface. For example, when it is possible to enter content except that the property of the input field is text, the electronic device may enter the copied content itself (e.g., an image included in the second screen or an image in which a specified area is captured in the second screen) in the input field without recognizing text.

According to an embodiment, when all the copied content is matched with the property of the at least one input field, the electronic device may enter all the copied content in the at least one input field on the user interface. For example, when the property of the input field is applicable to only a phone number type of data and when the copied content is "010-1234-5678", because all the copied content is matched with the property of the input field, the electronic device may enter "010-1234-5678" in the corresponding field on the user interface.

According to an embodiment, when the rest in which a specified type of some content is removed from the copied content is matched with the property of the at least one input field, the electronic device may enter the rest in which the some content is removed in the at least one input field on the user interface. For example, when the property of the input field is applicable to only a URL type of data and when the copied content is "It is abcd@abc.com", because the portion "abcd(@abc.com" in which the portion "It is" not associated with the URL is removed is matched with the property of the input field, the electronic device may enter "abcd(@abc.com" in the corresponding field on the user interface.

For example, when a plurality of portions applicable to the at least one input field are included in the copied content, the electronic device may display a button configured to selectively enter at least one of the plurality of portions in the at least one input field on the user interface. For example, when the property of the input field is applicable to only a phone number type of data and when the copied content is that "Please contact us at 010-1234-5678", the copied content includes numbers "010", "1234", and "5678" matched with the property of the input field. For example, the electronic device may display a button capable of selectively entering a plurality of portions "010", "1234", and "5678" applicable to the input field on the user interface. For example, the electronic device may selectively enter a portion of content in the input field based on a user input for selecting the displayed button. According to an embodiment, the electronic device may display content or at least a portion of the content entered through an input field corresponding to the input field of the first screen included in the user interface.

According to an embodiment, the user interface may include a button for switching the second screen to the first screen while entering the at least a portion of the copied content in the input field of the first screen. According to an embodiment, the user interface may include a button for entering the at least a portion of the copied content in the input field of the first screen. For example, the electronic device may enter the at least a portion of the copied content in the input field of the first screen while maintaining the displayed second screen or may switch the second screen to the first screen while entering the at least a portion of the copied content in the input field of the first screen, based on the selection of the button included in the user interface. According to an embodiment, when there are a plurality of input fields in the first screen, the user interface may include a button configured to select each of input fields of the user interface, which respectively correspond to the plurality of input fields. According to an embodiment, the electronic device may perform an operation corresponding to the button selected based on the user input for selecting the button included in the user interface.

According to an embodiment, the user interface may be independently provided for each of applications which are running. For example, the user interface may include information about an application to paste the copied content and/or a button for fixing or maintaining the user interface on the screen. For example, when displaying a first user interface for a first application, the electronic device may maintain the displaying of the first user interface in a floating state on the display based on a user input for fixing or maintaining the first user interface on the screen. Thereafter, when the screen switches again or when new content is copied, the electronic device may provide a second user interface for a second application while maintaining the first user interface.

Figure 9:
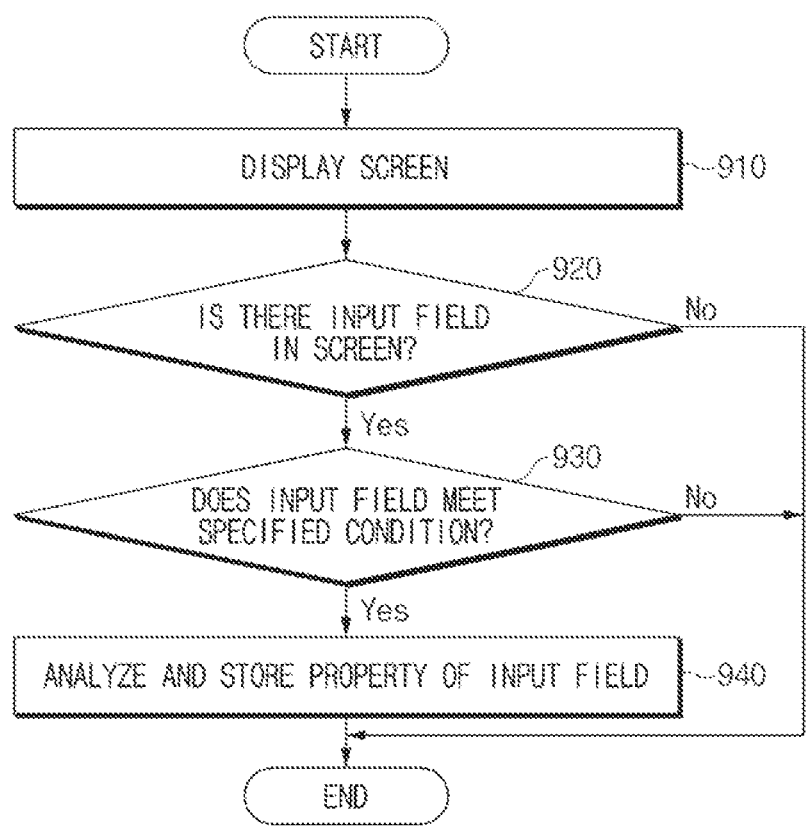
FIG. 9 illustrates a method for providing a user interface in an electronic device according to an embodiment.

FIG. 9 illustrates a method for providing a user interface in an electronic device (e.g., an electronic device 101 of FIG. 1 or an electronic device 200 of FIG. 2) according to an embodiment.

According to an embodiment, in operation 910, the electronic device may display a screen. For example, the electronic device may display an execution screen of an application.

According to an embodiment, in operation 920, the electronic device may determine whether there is at least one input field in the screen. According to an embodiment, when there is the input field in the screen, the electronic device may perform operation 930.

According to an embodiment, in operation 930, the electronic device may determine whether the input field meets a specified condition. According to an embodiment, the specified condition may include at least one of when the at least one input field is focused, when the at least one input field is displayed on a specified area of the display, when the at least one input field occupies the display over a specified area, and when the screen includes a plurality of input fields.

According to an embodiment, operation 930 may be omitted. For example, when there is the at least one input field in the screen, the electronic device may perform operation 940.

According to an embodiment, in operation 940, the electronic device may analyze and store a property of the input field. According to an embodiment, the property of the input field may include at least one of a kind, a format, or a property, and a type of content applicable to the input field. For example, the electronic device may identify a text kind (e.g., at least one of Hangul, an alphabet, a number, or a special symbol) capable of being entered in the input field, which is a property of the input field, or may identify a range of data (e.g., a string length or an upper limit or a lower limit of a number) capable of being entered in the input field and/or a data type (format) (e.g., an email, a URL, an address, a zip code, or a phone number) capable of being entered in the input field. According to an embodiment, the electronic device may store the property of the analyzed input field in its memory.

For example, when the screen displayed by the electronic device includes an HTML-based web page, the property of the input field may include a property of a specified tag indicating an input field included in an HTML source of the web page. For example, the electronic device may analyze an HTML source of the displayed web page screen and may determine whether it includes an <input>, <textarea>, or <datalist> tag associated with the input field among HTML tags. For example, the electronic device may determine whether a type among properties of the input field set in the HTML source is a type capable of classifying the entered data type. For example, the electronic device may determine whether a data type capable of being entered in the input field based on the HTML source is limited to a URL, an email, or a phone number (a number). For example, the electronic device may determine whether a data range (e.g., a boundary value such as min/mas/interval or a pattern (a regular expression capable of being entered)) capable of being entered in the input field based on the HTML source is set. According to an embodiment, the electronic device may store the analyzed property information as metadata of the input field with respect to the at least one input field.

According to an embodiment, when displaying the screen on the display or when the displayed screen switches, the electronic device may perform operations 910 to 940. For example, the electronic device may perform the operations for a displayed screen, when the screen is displayed on the display, and may perform the operations for a first screen, when the screen switches from the first screen to a second screen on the display. For another example, when the second screen switches to the first screen, the operations may be performed for the second screen.

Figure 10:
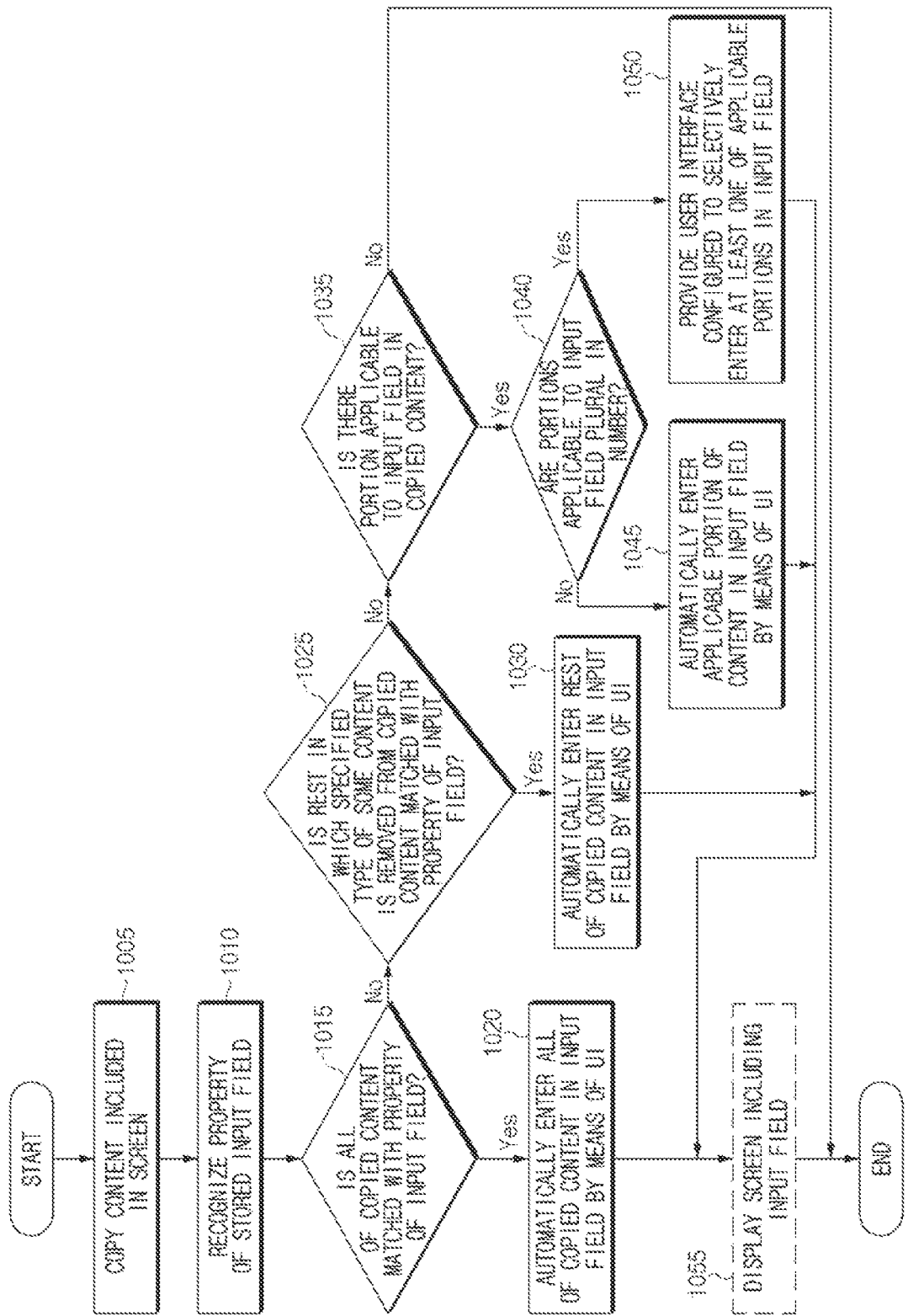
FIG. 10 illustrates a method for providing a user interface in an electronic device according to an embodiment.

FIG. 10 illustrates a method for providing a user interface in an electronic device (e.g., an electronic device 101 of FIG. 1 or an electronic device 200 of FIG. 2) according to an embodiment. According to an embodiment, after the electronic device switches a screen displayed on a touch screen display from a first screen to a second screen, operations of FIG. 10 may be performed.

According to an embodiment, in operation 1005, the electronic device may copy content included in the second screen. For example, the electronic device may select or copy at least some of the pieces of content included in the second screen based on a user input.

According to an embodiment, in operation 1010, the electronic device may identify a property of the stored input field. According to an embodiment, the input field may be included in a screen (e.g., the first screen) displayed before the currently displayed screen (e.g., the second screen). For example, the electronic device may identify a property of at least one input field included in the first screen.

According to an embodiment, in operation 1015, the electronic device may determine whether all the copied content is matched with the property of the at least one input field. For example, when it is possible to enter only data where the property of the input field is an email format and when the copied content is "abcd @abc.com", it may be seen that all the copied content is matched with the property of the input field. According to an embodiment, the electronic device may perform operation 1020 when all the copied content is matched with the property of the at least one input field, and may perform operation 1025 when all the copied content is not matched with the property of the at least one input field.

According to an embodiment, in operation 1020, the electronic device may automatically enter all the copied content in the input field on a user interface (UI) (e.g., a user interface 540 of FIG. 5, a user interface 640 of FIG. 6, or a user interface 740 of FIG. 7). For example, the electronic device may automatically enter all the copied content "abcd@ abc.com" in an input field of an email property. For example, the electronic device may enter and display all the copied content in the input field included in the user interface and may enter all the copied content in an input field of the first screen based on a user input through the user interface.

According to an embodiment, in operation 1025, the electronic device may determine whether a remaining portion of the copied content in which a specified type of some content is removed from the copied content is matched with the property of the input field. For example, when it is possible to enter only data (e.g., a number and a specified symbol) of a phone number format and when the copied content is "Please contact us at 010-9876-5432", it may be seen that the rest "010-9876-5432" in which a specified type of some content "Please contact use at" except for numbers used for a phone number is removed from the copied content is matched with the property of the input field. According to an embodiment, the electronic device may perform operation 1030, when the rest in which the specified type of some content is removed from the copied content is matched with the property of the input field, and may perform operation 1035, if not. For example, when it is possible to enter only data in which the property of the input field is an email format and when the copied content is "Please contact us at 010-9876-5432", the electronic device may perform operation 1035.

According to an embodiment, in operation 1030, the electronic device may automatically enter the rest of the copied content in the input field on the user interface. For example, the electronic device may automatically enter the rest "010-9876-5432" in which the specified type is excluded from the copied content in the input field of the phone number property. For example, the electronic device may enter and display the rest of the copied content in the input field included in the user interface and may enter the rest of the copied content in the input field of the first screen based on a user input through the user interface.

According to an embodiment, in operation 1035, the electronic device may determine whether there is a portion applicable to the input field in the copied content. For example, when it is possible to enter only data (e.g., a number and a specified symbol) in which the property of the input field is a phone number format, the electronic device may determine whether a number or a specific symbol applicable to the phone number format is included in the copied content.

According to an embodiment, in operation 1040, the electronic device may determine whether portions applicable to the input field are plural in number in the copied content. For example, when the copied content is "Please contact us at +82-10-5678-1234" and when it is possible to enter only numbers which are an input field associated with the phone number and exclude "–", the electronic device may identify that the plurality of portions applicable to the input field include portions of "+82", "10", "5678", and "1234". According to an embodiment, the electronic device may perform operation 1045, when the portions applicable to the input field are not plural in number in the copied content, and may perform operation 1050, when the portions applicable to the input field are plural in number.

According to an embodiment, in operation 1045, the electronic device may automatically enter an applicable portion of the content in the input field on the user interface. For example, when it is possible to enter only data in which the property of the input field is the phone number format and when a portion of the copied content is configured with a series of numbers, the electronic device may extract and automatically enter a series of number portions in the input field. According to an embodiment, the electronic device may enter and display a portion of the copied content in the input field included in the user interface and may wait for an additional user input.

According to an embodiment, in operation 1050, the electronic device may provide a user interface configured to selectively enter at least one of the applicable portions in the input field. For example, the electronic device may display a button capable of selectively entering the applicable portions "+82", "10", "5678", and "1234" on the user interface. According to an embodiment, the electronic device may enter at least a portion selected based on a user input in the input field on the user interface.

According to an embodiment, in operation 1055, the electronic device may display a screen (e.g., the first screen) including the input field. According to an embodiment, the electronic device may switch the currently displayed screen (e.g., the second screen) to the previously displayed screen (e.g., the first screen) including the input field.

According to an embodiment, operation 1055 may not be an essential operation, which may be omitted. For example, the user interface may include a button for entering the copied content in the input field and a button for switching a screen while entering the copied content in the input field. For example, the electronic device may selectively perform operation 1055 in response to a button selected based on the user input received through the user interface.

Figure 11:
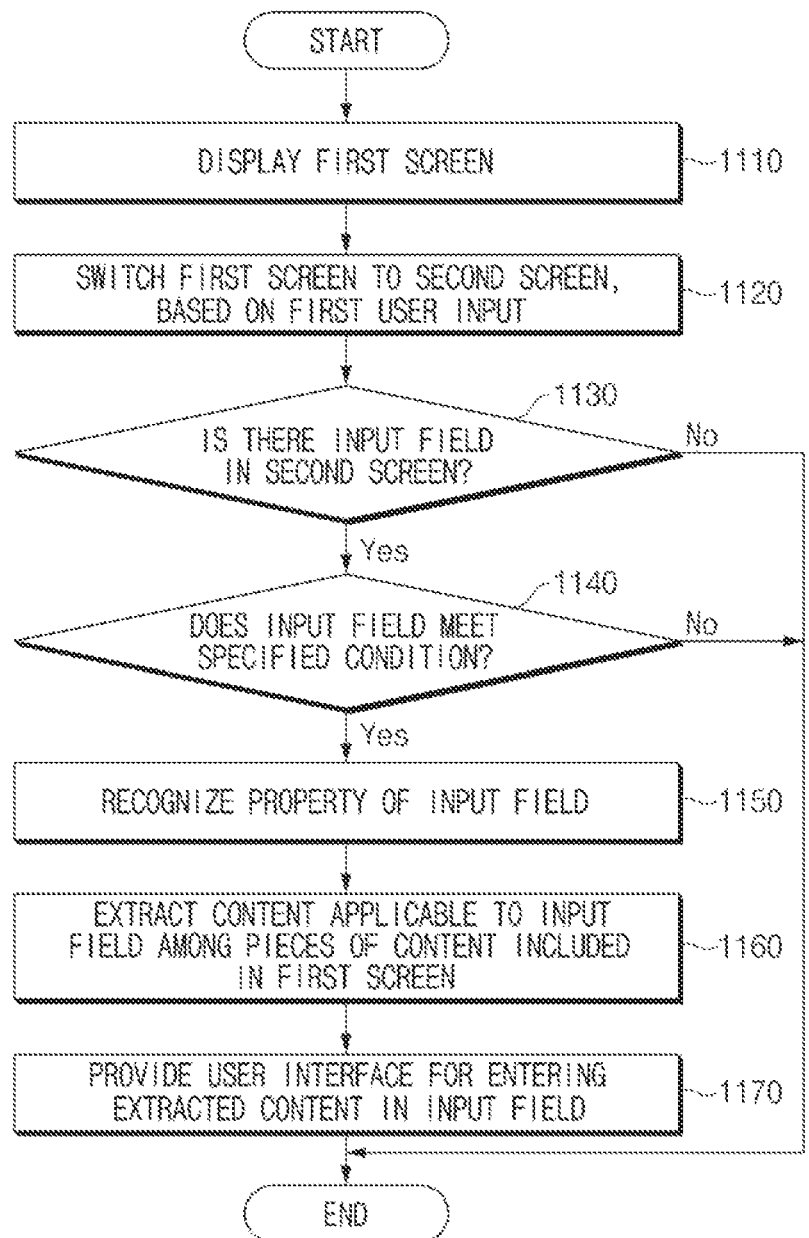
FIG. 11 illustrates a method for providing a user interface in an electronic device according to an embodiment.

FIG. 11 illustrates a method for providing a user interface in an electronic device (e.g., an electronic device 101 of FIG. 1 or an electronic device 200 of FIG. 2) according to an embodiment.

According to an embodiment, in operation 1110, the electronic device may display a first screen on its display. For example, the electronic device may display an execution screen of an application on the display.

According to an embodiment, in operation 1120, the electronic device may switch the first screen to a second screen, based on a first user input. For example, when switching the screen, the electronic device may execute the first screen (an application which provides the first screen) in the background.

According to an embodiment, in operation 1130, the electronic device may determine whether there is at least one input field in the second screen. According to an embodiment, when there is the input field in the second screen, the electronic device may perform operation 1140.

According to an embodiment, in operation 1140, the electronic device may determine whether the at least one input field of the second screen meets a specified condition. According to an embodiment, the specified condition may include when the at least one input field is focused or selected. According to an embodiment, when the input field meets the specified condition, the electronic device may perform operation 1150.

According to an embodiment, in operation 1150, the electronic device may identify a property of the input field. According to an embodiment, the property of the input field may include at least one of a kind, a format, or a property, and a type of content applicable to the input field.

According to an embodiment, in operation 1160, the electronic device may extract content applicable to an input field of the second screen among pieces of content included in the first screen based on the property of the input field. For example, the electronic device may capture the second screen and may recognize text included in the captured second screen. For example, the electronic device may extract at least a portion of the recognized text, which is applicable to the input field of the second screen.

According to an embodiment, in operation 1170, the electronic device may provide a user interface (e.g., a user interface 540 of FIG. 5, a user interface 640 of FIG. 6, or a user interface 740 of FIG. 7) for entering the extracted content in the input field of the second screen. According to an embodiment, the user interface may include an input field corresponding to each of at least one input field displayed on the second display, a button for switching the extracted content, the input field, or a screen, and/or at least one button used to enter the at least a portion of the copied content in the input field. For example, the user interface may include an input field corresponding to the input field included in the second screen. The electronic device may provide content of the first screen, which is extracted based on the property of the input field of the second screen, in a state of being automatically entered in the input field of the user interface. According to an embodiment, the electronic device may collectively enter the extracted content in the input field of the second screen based on a user input received through the user interface. According to an embodiment, the electronic device may immediately enter the extracted content matched with the property of the input field in the input field of the second screen without providing the user interface. For example, the electronic device may provide an autocomplete function of entering the extracted content in the input field.

A method according to an embodiment disclosed in the disclosure may include displaying a first screen on a display, switching the first screen to a second screen, based on a first user input, determining whether there is at least one input field in the first screen, in response to the first user input, identifying a property of the at least one input field, when the at least one input field meets a specified condition, copying content included in the second screen, based on a second user input, and determining whether at least a portion of the copied content is applicable to the at least one input field based on the property of the at least one input field, in response to the second user input.

According to an embodiment, the method may further include providing a user interface for entering the at least a portion of the copied content in the at least one input field, on the display, when the at least a portion of the copied content is applicable to the at least one input field.

According to an embodiment, the specified condition may include at least one of when the at least one input field is focused, when the at least one input field is displayed on a specified area of the display, when the at least one input field occupies the display over a specified area, and when the first screen includes a plurality of input fields.

For example, the method may further include entering all the copied content in the at least one input field on the user interface, when all the copied content is matched with the property of the at least one input field.

For example, the method may further include entering the rest in which a specified type of some content is removed from the copied content in the at least one input field on the user interface, when the rest in which the some content is removed is matched with the property of the at least one input field.

For example, the method may further include displaying a button configured to selectively enter at least one of a plurality of portions applicable to the at least one input field in the at least one input field on the user interface, when the plurality of portions are included in the copied content.

According to an embodiment, the user interface may include at least one input field respectively corresponding to at least one input field of the first screen.

According to an embodiment, when there are a plurality of input fields in the first screen, the user interface may include a button configured to select each of input fields of the user interface, which respectively correspond to the plurality of input fields.

According to an embodiment, the first screen may include a hypertext markup language (HTML)-based web page, and the property of the at least one input field may include a property of a specified tag indicating an input field included in an HTML source of the web page.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a display;
   a memory storing instructions; and
   a processor operatively connected with the display and the memory, and configured to execute the instructions to:
   control the display to display a first screen,
   based on a first user input, control the display to switch from the first screen to a second screen,
   identify whether at least one input field in the first screen meets a specified condition,
   based on identifying the at least one input field in the first screen meets the specified condition, identify a property of the at least one input field,
   based on a second user input, copy content included in the second screen,
   identify whether at least a portion of the copied content is applicable to the at least one input field based on the property of the at least one input field,
   in response to identifying the at least the portion of the copied content is applicable to the at least one input field, control the display to display a pop-up window for entering the at least the portion of the copied content in the at least one input field,
   wherein the pop-up window is displayed on a partial area of the second screen while the second screen is displayed,
   wherein the pop-up window provides a preview of the at least the portion of the copied content and the at least one input field of the first screen into which the at least the portion of the copied content is to be input,
   wherein the first screen is a destination window configured to store the at least the portion of the copied content, and
   wherein the first screen is displayed on the display at a first time, and the second screen and the pop-up window are displayed on the display at a second time that is different from the first time.

2. The electronic device of claim 1, wherein the property of the at least one input field includes at least one of a kind, a format, a property, and a type of content applicable to the at least one input field.

3. The electronic device of claim 1, wherein the specified condition includes at least one of:
   the at least one input field is focused,
   the at least one input field is displayed on a specified area of the display,
   the at least one input field occupies the display over the specified area of the display, and
   the first screen includes a plurality of input fields.

4. The electronic device of claim 1, wherein the pop-up window includes a button for switching the second screen to the first screen while entering the at least the portion of the copied content in the at least one input field.

5. The electronic device of claim 1, wherein the processor is further configured to execute the instructions to:
   based on all the copied content being matched with the property of the at least one input field, enter all the copied content in the at least one input field via the pop-up window.

6. The electronic device of claim 1, wherein the processor is further configured to execute the instructions to:
based on a remaining portion of the copied content, in which a specified type of some content is removed from the copied content, being matched with the property of the at least one input field, enter the remaining portion of the copied content in the at least one input field via the pop-up window.

7. The electronic device of claim 1, wherein the processor is further configured to execute the instructions to:
based on a plurality of portions applicable to the at least one input field being included in the copied content, control the display to display a button configured to selectively enter at least one of the plurality of portions in the at least one input field on the pop-up window.

8. The electronic device of claim 1, wherein the first screen includes a plurality of input fields, and
the pop-up window includes a button configured to select the plurality of input fields.

9. The electronic device of claim 1, wherein the first screen includes a hypertext markup language (HTML)-based web page, and
wherein the property of the at least one input field includes a property of a specified tag indicating an input field included in an HTML source of the HTML-based web page.

10. A method of operating an electronic device, the method comprising:
displaying a first screen on a display of the electronic device;
based on a first user input, switching the first screen to a second screen on the display;
identifying whether at least one input field in the first screen meets a specified condition;
based on identifying the at least one input field in the first screen meets the specified condition, identifying a property of the at least one input field;
based on a second user input, copying content included in the second screen;
identifying whether at least a portion of the copied content is applicable to the at least one input field based on the property of the at least one input field,
in response to identifying that the at least the portion of the copied content being applicable to the at least one input field, displaying on the display a pop-up window for entering the at least the portion of the copied content in the at least one input field,
wherein the pop-up window is displayed on a partial area of the second screen while the second screen is displayed,
wherein the pop-up window provides a preview of the at least the portion of copied content and the at least one input field of the first screen into which the at least the portion of the copied content is to be input,
wherein the first screen is a destination window configured to store the at least the portion of the copied content, and
wherein the first screen is displayed on the display at a first time, and the second screen and the pop-up window are displayed on the display at a second time that is different from the first time.

11. The method of claim 10, wherein the specified condition includes at least one of:
the at least one input field is focused,
the at least one input field is displayed on a specified area of the display,
the at least one input field occupies the display over the specified area of the display, and
the first screen includes a plurality of input fields.

12. The method of claim 10, further comprising:
based on all the copied content being matched with the property of the at least one input field, entering all the copied content in the at least one input field via the pop-up window.

13. The method of claim 10, further comprising:
based on a remaining portion of the copied content, in which a specified type of some content is removed from the copied content, being matched with the property of the at least one input field, entering the remaining portion of the copied content in the at least one input field via the pop-up window.

14. The method of claim 10, further comprising:
based on a plurality of portions applicable to the at least one input field being included in the copied content, displaying a button configured to selectively enter at least one of the plurality of portions in the at least one input field on the pop-up window.

15. The method of claim 10, wherein the pop-up window includes at least one input field respectively corresponding to the at least one input field of the first screen,
the first screen includes a plurality of input fields, and
the pop-up window includes a button configured to select each of input fields of the pop-up window, which respectively correspond to the plurality of input fields.

* * * * *